United States Patent [19]

Joyce et al.

[11] 4,161,024
[45] Jul. 10, 1979

[54] PRIVATE CACHE-TO-CPU INTERFACE IN A BUS ORIENTED DATA PROCESSING SYSTEM

[75] Inventors: Thomas F. Joyce, Burlington; Thomas O. Holtey, Newton Lower Falls, both of Mass.

[73] Assignee: Honeywell Information Systems Inc., Waltham, Mass.

[21] Appl. No.: 863,097

[22] Filed: Dec. 22, 1977

[51] Int. Cl.² .............................................. G06F 13/00
[52] U.S. Cl. ................................................... 364/200
[58] Field of Search ... 364/200 MS File, 900 MS File

[56] References Cited
U.S. PATENT DOCUMENTS

| | | | |
|---|---|---|---|
| 3,820,078 | 6/1974 | Curley et al. | 364/200 |
| 3,949,375 | 4/1976 | Ciarlo | 364/200 |
| 3,973,244 | 8/1976 | Lovercheck et al. | 364/200 |
| 3,993,981 | 11/1976 | Cassarino, Jr. et al. | 364/200 |
| 3,999,163 | 12/1976 | Levy et al. | 364/200 |
| 4,016,541 | 4/1977 | Delagi et al. | 364/200 |

Primary Examiner—Melvin B. Chapnick
Attorney, Agent, or Firm—Nicholas Prasinos; Ronald T. Reiling

[57] ABSTRACT

A data processing system having a system bus; a plurality of system units including a main memory, a cache memory, a central processing unit (CPU) and a communications controller all connected in parallel to the system bus. The controller operates to supervise interconnection between the units via the system bus to transfer data therebetween, and the CPU includes a memory request device for generating data requests in response to the CPU. The cache memory includes a private interface connecting the CPU to the cache memory for permitting direct transmission of data requests from the CPU to the cache memory and direct transmission of requested data from the cache memory to the CPU; a cache directory and data buffer for evaluating the data requests to determine when the requested data is not present in the cache memory; and a system bus interface connecting the cache memory to the system bus for obtaining CPU requested data not found in the cache memory from the main memory via the system bus in response to the cache directory and data buffer. The cache memory may also include replacement and update apparatus for determining when the system bus is transmitting data to be written into a specific address in main memory and for replacing the data in a corresponding specific address in the cache memory with the data then on the system bus.

3 Claims, 25 Drawing Figures

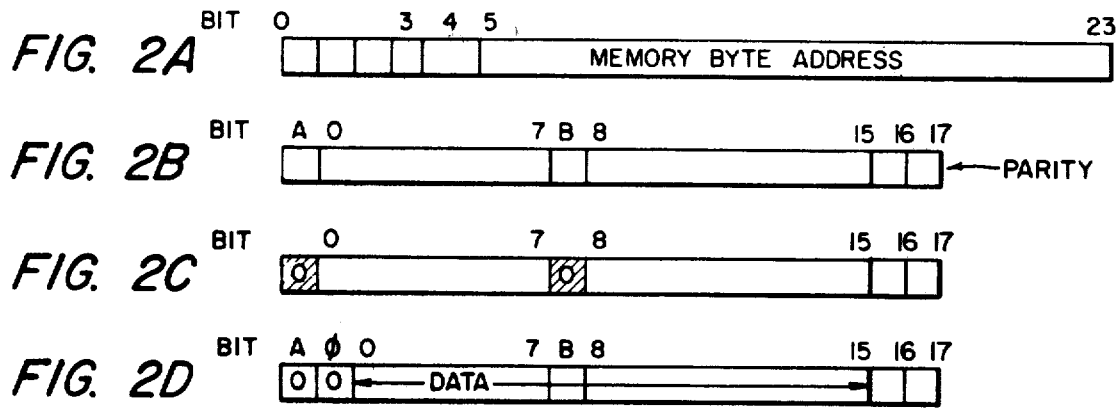
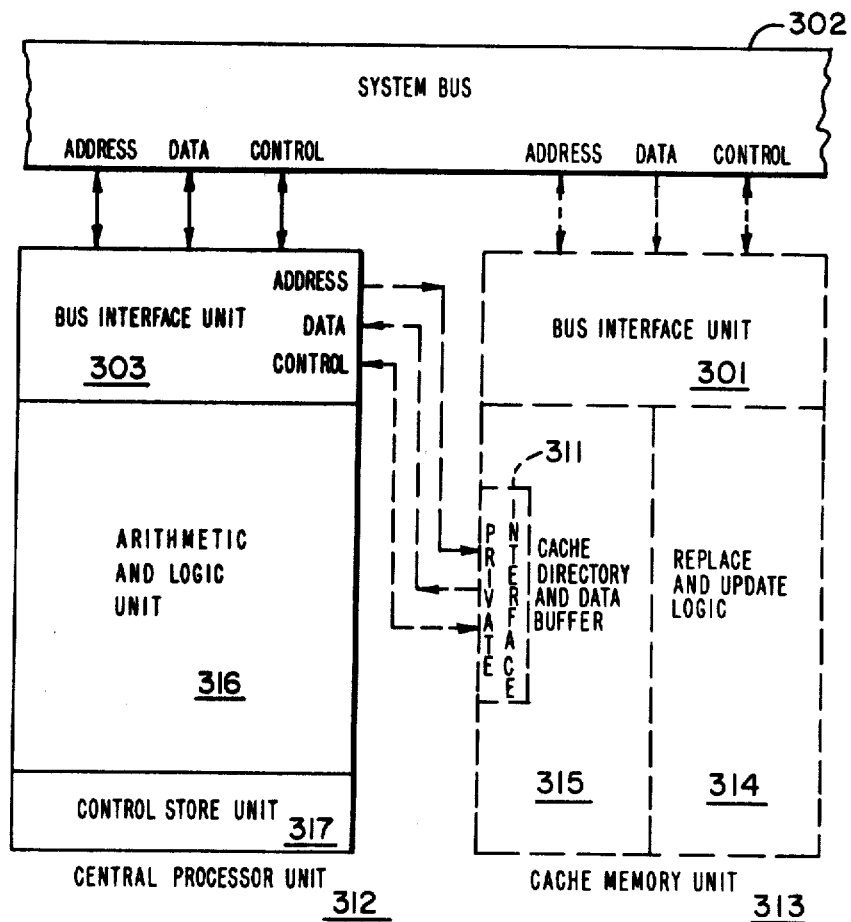

PRIVATE CACHE-TO-CPU INTERFACE IN A BUS ORIENTED DATA PROCESSING SYSTEM

RELATED APPLICATIONS

The following patent applications which are assigned to the same assignee as the instant application and have been filed on an even date with the instant application have related subject matter.

| TITLE | INVENTOR (S) | Serial No. |
|---|---|---|
| 1. FIFO Activity Queue for a Cache Store | T. Joyce | 863,091 |
| 2. Round Robin Replacement for Cache Store | T. Joyce | 863,102 |
| 3. Continuous Updating of Cache Store | T. Joyce<br>T. Holtey<br>W. Panepinto, Jr. | 863,092 |
| 4. A Word Oriented High Speed Buffer Memory System Connected to a System Bus | T. Joyce<br>T. Holtey<br>W. Panepinto, Jr. | 863,093 |
| 5. Out-of-Store Indicator for a Cache Store | T. Joyce<br>W. Panepinto, Jr. | 863,096 |
| 6. Initialization of Cache Store | T. Joyce<br>W. Panepinto, Jr. | 863,094 |
| 7. Multi-Configurable Cache Store System | T. Joyce<br>T. Holtey | 863,098 |
| 8. High Speed Buffer Memory System with Word Prefetch | T. Joyce<br>T. Holtey | 863,095 |

BACKGROUND OF THE INVENTION

1. Field of the Invention

This invention relates generally to minicomputing systems, and particularly to storage hierarchies having high speed low capacity storage devices coupled via a system bus to lower speed high capacity storage devices, and more particularly to a private CPU-Cache Memory Interface.

2. Description of the Prior Art

The storage hierarchy concept is based on the phenomenon that individual storage programs under execution exhibit the behavior that in a given period of time a localized area of memory receives a very high frequency of usage. Thus, a memory organization that provides a relatively small size buffer at the CPU interface and the various levels of increasing capacity slower storage can provide an effective access time that lies somewhere in between the range of the fastest and the slowest elements of the hierarchy and provides a large capacity memory system that is "transparent" to the software.

This invention takes advantage of a word organized memory. Prior art was limited to storing the requested data word with its address in hardware registers. When the need came about for expanded size low cost buffers, the prior art utilized a block organization. If a particular word was requested by the CPU, the block containing that word was stored in a high speed data buffer. This had the disadvantage of bringing into the high speed buffer words with a relatively low probability of usages. Assuming a four word block, if word 4 is requested, the entire block including words 1, 2 and 3 which have a relatively low probability of usage, are brought into the high speed buffer. To optimize the usage of the memory hierarchy, the operating system must organize memory in such a manner that software submodules and data blocks start with word 1 of the block. To overcome this difficulty, the prior art utilized a "block look ahead." When one block was in the high speed buffer, a decision was made during the processing of a data word in that block to bring the next block into the high speed buffer.

Some typical patents indicative of this philosophy are as follows:

U.S. Pat. No. 3,231,868 issued to L. Bloom, et al, entitled "Memory Arrangement for Electronic Data Processing System" discloses a "look aside" memory which stores a word in a register and its main memory address in an associated register. To improve performance, U.S. Pat. No. 3,588,829, issued to L. J. Boland, et al, discloses an eight-word block fetch to the high speed buffer from main memory if any word in the eight-word block is requested by the CPU.

An article by C. J. Conti, entitled "Concepts for Buffer Storage" published in the IEEE Computer Group News, March 1969, describes the transfer of 64-byte blocks as used on the IBM 360/85 when a particular byte of that block not currently in the buffer is requested. The IBM 360/85 is described generally on pages 2 through 30 of the IBM System Journal, Vol. 71, No. 1, 1968. U.S. Pat. No. 3,820,078 issued on Curley, et al, entitled "Multilevel Storage System Having a Buffer Store with Variable Mapping Modes" describes the transfer of blocks of 32 bytes or hold blocks of 16 bytes from main memory to the high speed buffer when a word (4 bytes) of the block or half-block is requested by the CPU. U.S. Pat. No. 3,896,419 issued to Lange, et al, entitled "Cache Memory Store in a Processor of a Data Processing System" describes the transfer of a four word block from main memory to the high speed buffer when a word of that block is requested by the CPU. U.S. Pat. No. 3,898,624 issued to Tobias entitled "Data Processing System with Variable Prefetch and Replacement Algorithms" describes the prefetching of the next line (32 bytes) from main memory to the high speed buffer when a specific byte is requested by the CPU of the previous line.

In minicomputers, particularly those minicomputers which are organized in such a fashion that a plurality of system units are connected in common to a system bus, the prior art systems present a number of problems all having to do with reducing the throughput of the minicomputer. The prior art sends back to cache from main memory, the entire block of words in which the requested word is located. This includes words with addresses preceding the requested word and words with addresses following the requested words. In most cases the CPU will require as the following cycle the word in the next higher address. This results in words with high probability of being used as well as words with lower probability of being used being transferred into cache. To overcome this problem, the prior art requires that the programmers on the operating system optimize their programs to start sequences off with words at the first address of each block. Another problem in the prior art is that a block of words transferred from main memory to cache comes over in successive cycles, for example, a 32 byte block may be transferred in 8 cycles, 4 bytes at a time. In the minicomputer bus architecture system this would greatly reduce the throughput of the system.

Still another problem in the minicomputer system utilizing a system bus and an I/O bus (input/output bus) type of architecture, is the increase in traffic over the system bus when CPU read requests have to be satisfied utilizing the system bus, because such increase in traffic further decreases the throughput of the minicomputer system.

What was needed, therefore, was a cache memory system which would not only provide for the greatest prbability of hits (i.e. finding the word resident in cache memory when a request is made by some unit) but will not increase traffic on the system bus in satisfying the various read or write requests in a computer architecture which utilizes a bus for interconnecting various components of the computer system.

Studies of memory access behavior during program execution indicates that over 90% of the accesses to memory were to read instructions or data and fewer than 10% of the accesses by the control processor were to write into memory. Furthermore, most programs contain execution loops in which a relatively small number of instruction and data locations are referenced interactively. Accordingly, depending on the program, between 80 and 95% of the total accesses could therefore be satisfied by reading from the cache. Accordingly, a direct private interface between the processor and cache and the use of high speed logic circuits therebetween not only could reduce the processor access wait time to a fraction of the access delay encountered when accessing main memory through the system bus, but reduces information transfer traffic on the bus. However, since it is desirable not to inhibit or slow down communications between other units connected to the bus and main memory, direct access to main memory by such other units including the CPU in preferable.

In the prior art there are innumerable devices where there are direct connections between CPU and cache memory. Some typical ones are disclosed in the following U.S. Pat. Nos. (1) 3,820,078 issued June 25, 1974; (2) 3,735,360 issued May 22, 1973; (3) 3,898,624 issued August 5, 1975; (4) 3,806,888 issued Apr. 23, 1974; and (5) 3,896,419 issued July 22, 1975. However, most of these arrangements do not provide for direct access of main memory by the CPU and none of the above provide communication between system components i.e. peripherals, controllers, main memory, CPU via a system bus to which they are connected.

OBJECTS OF THE INVENTION

It is an object of the invention to provide an improved cache memory system.

It is another object of the invention to provide an improved cache memory system for use in a computer system of the type utilizing a bus architecture.

It is still another object of the invention to provide improved transfer of information between a CPU and a cache memory.

It is still another object of the invention to provide improved communication between main memory and other system components (i.e. CPU, peripherals, controllers, etc.) comprising a computer system.

It is a further object of the invention to minimize information traffic congestion on a computer bus connecting a plurality of system units.

These and other objects of the invention will become obvious upon a reading of the specification together with the drawings.

SUMMARY OF THE INVENTION

In a data processing system which is comprised of a plurality of system units including a main memory, a cache-memory and a CPU, all connected to a system bus and communicating with each other via the system bus, there is provided a private interface between the CPU and the cache memory for permitting direct cache memory read access by the CPU. Writing into main memory, or updating main memory however is performed via the system bus, and accodingly the cache-memory monitors and system bus for such writing or updating of main memory in order to update its own information. However, when a request is made for information to cache memory by the CPU over the private interface and such information is not available in cache memory, then cache memory issues a request to main memory via the system bus for such information, which is then sent to cache memory over the system bus.

BRIEF DESCRIPTION OF THE DRAWINGS

The manner in which the apparatus of the present invention is constructed and its mode of operation can best be understood in the light of the following detailed description, together with the accompanying drawings, in which:

FIGS. 2a-2d illustrate the format of various information transferred over the bus of FIG. 2.

FIG. 3 is a general block diagram of the present invention.

FIG. 4 is a detailed block diagram of CPU service logic.

DETAILED DESCRIPTION OF THE PREFERRED EMBODIMENT

Figure 1:
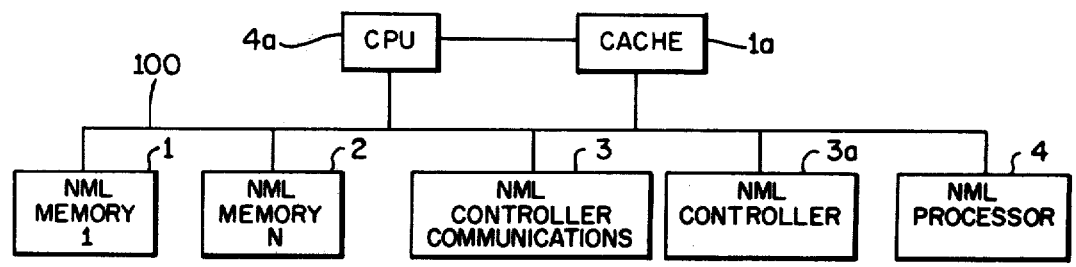
FIG. 1 is a general block diagram for one type of communication bus utilized by the cache memory, main memory and CPU.
Figure 1A:
FIGS. 1a and 1b illustrate the format of the address bus and data bus of the bus system of FIG. 1.

The data processing bus of the present invention provides one communication path between two units to a given system. FIG. 1 illustrates one type of bus wherein the controllers are coupled on the same bus as the memories and the processors. The bus utilizes 24 bits for addressing and 20 bits for data—18 bits including an A and B bit and 2 additional bits for parity. This type of bus is described in detailed in the above-referenced allowed U.S. patent application Ser. No. 591,964, filed June 30, 1975 and now issued into U.S. Pat. No. 3,993,981 and assigned to the same assignee as the instant invention and included herein by reference. It should be noted that FIG. 1 of U.S. Pat. No. 3,993,981 includes more devices attached to the bus than shown on FIG. 1 of the instant application. It should be understood, however, that any number of devices up to the maximum for which the bus was designed may be coupled to the bus.

Figure 2:
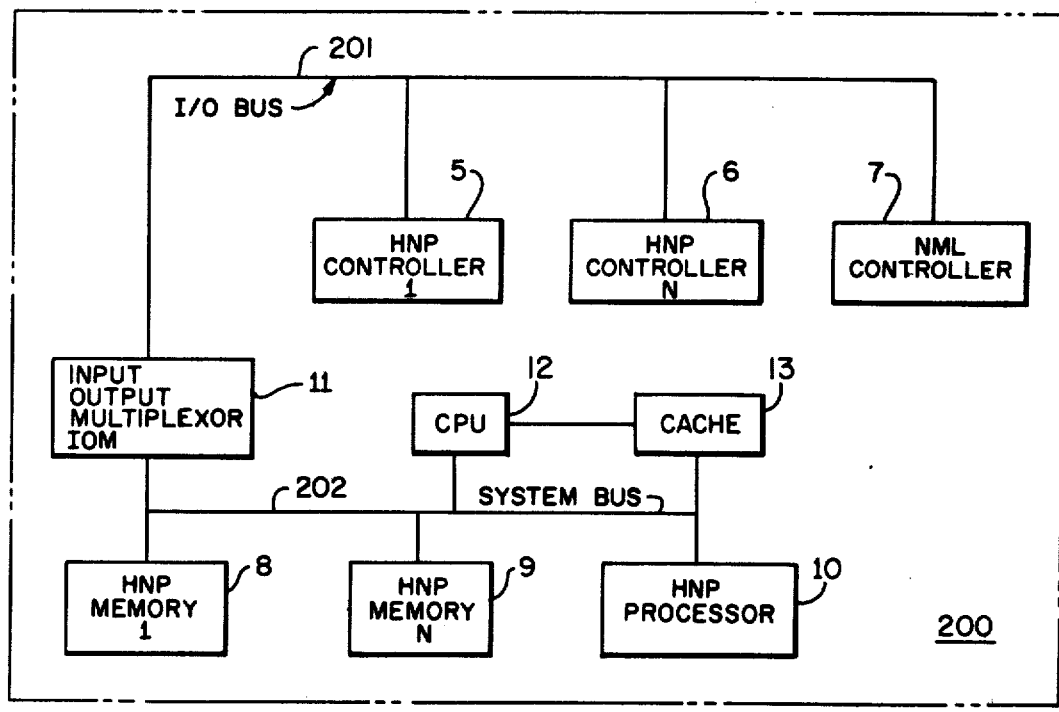
FIG. 2 is a general block diagram of another type of bus utilized by the main memory, cache memory and CPU.

Another bus is illustrated in FIG. 2 wherein the basic bus system is divided into 2 buses, an I/O bus and a system bus separated by an input/output multiplexor (IOM) 11. In this type of bus system, the I/O bus interfaces all the I/O controllers whereas the system bus interfaces the memories and processors. A typical word format of the bus system of FIG. 2 is shown on FIGS. 2a-2d wherein FIG. 2a is the address portion of the bus and FIGS. 2b-2d are data formats. It should be understood that other formats with different word lengths can also be used. Although a few typical controllers are shown coupled to the I/O bus, it is designed to have up to 46 connectable units. However, the number of I/O devices supported on a single I/O bus may be greater than this number because many of the units support several I/O devices at the same time. Similarly, although two memory devices and one processor are shown connected to the system bus of FIG. 2, several such units may be connected up to their maximum allowable for any system, including subsets of memory such as cache memory, pages, etc.

A main feature of these types of buses is that communication may be established directly between units on a bus such as for example, between NML memory 1 and NML controller 3, or between HNP controller 5 and HNP memory 9 without any intervention from a central processing unit.

Referring to FIG. 1 and to the above-referenced U.S. Pat. No. 3,993,981, a typical NML bus system includes a multi-line bus 100 coupled with an NML memory 1 and an NML memory 2. Also, on the same bus there is shown a typical NML controller 3 for communications, a typical NML controller 3a, an NML processor 4, a typical CPU 4a and a typical cache memory 1a. Also connected on the bus may be included, for example, a scientific arithmetic unit and various controllers which in turn are themselves coupled to control other peripheral devices such as unit record or tape peripheral devices. NML controller 3 may be used to provide communications control via modem devices. (See above referenced U.S. Pat. No. 3,993,981).

Referring now to FIG. 2, the HNP bus 200 is shown with some typical units connected thereto. It should be understood that according to the design, many units beyond those shown can be coupled thereto, although for the purposes of disclosing this invention, the typical units shown herein suffice. The HNP bus 200 is comprised of the I/O bus 201 and the system bus 202. As previously noted, the controllers are coupled to the I/O bus 201 such as HNP controllers 1 through N, 5, 6 and NML controller 7. On the system portion of the bus 202, typical HNP memories 1 through N, 8, 9 and typical HNP processor 10, a typical CPU 12 and a typical cache memory 13 are coupled. Also coupled to the system bus 202 may be included for example, a scientific arithmetic unit (not shown) and various peripheral devices such as mass storage devices, tape devices, and unit record devices (also not shown). The input/output multiplexor (IOM) 11 provides a path for data and control information between components attached to the HNP system bus such as the the main storage units or the central processors and the I/O controller (sometimes referred herein as channels) attached to the HNP I/O bus 201.

Figure 6A:
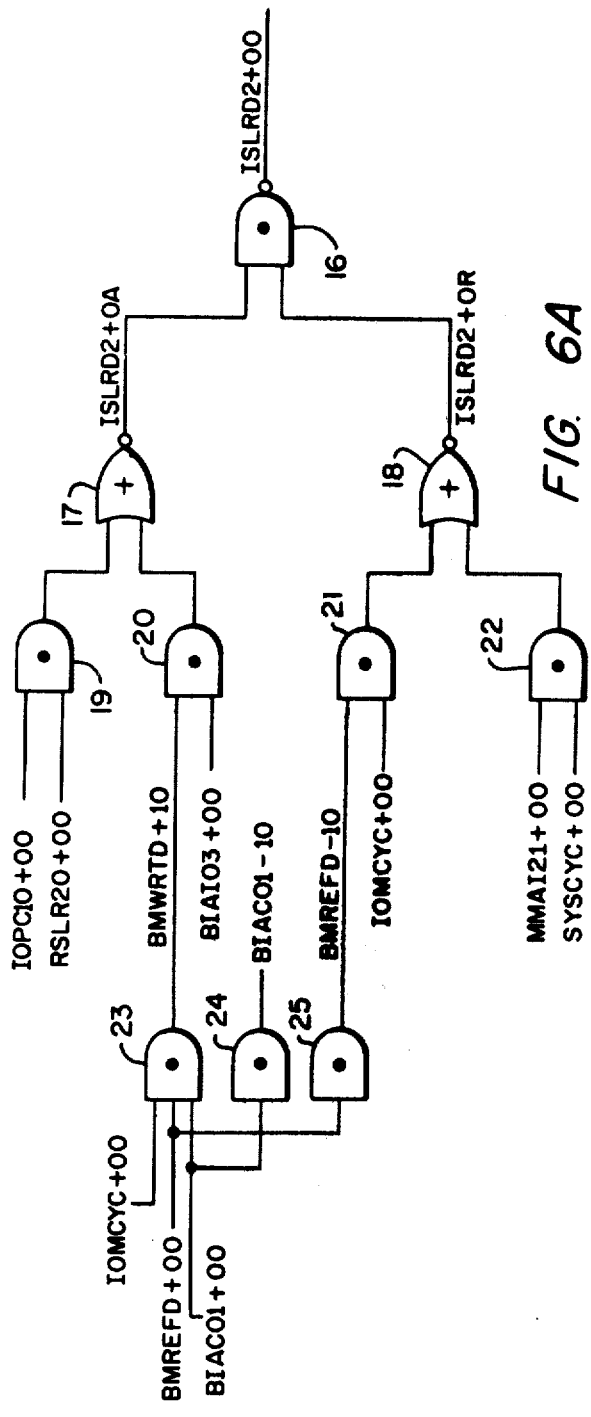
FIGS. 6a and 6b are logic block diagrams of a portion of the input/output IOM bus interface.
Figure 6B:
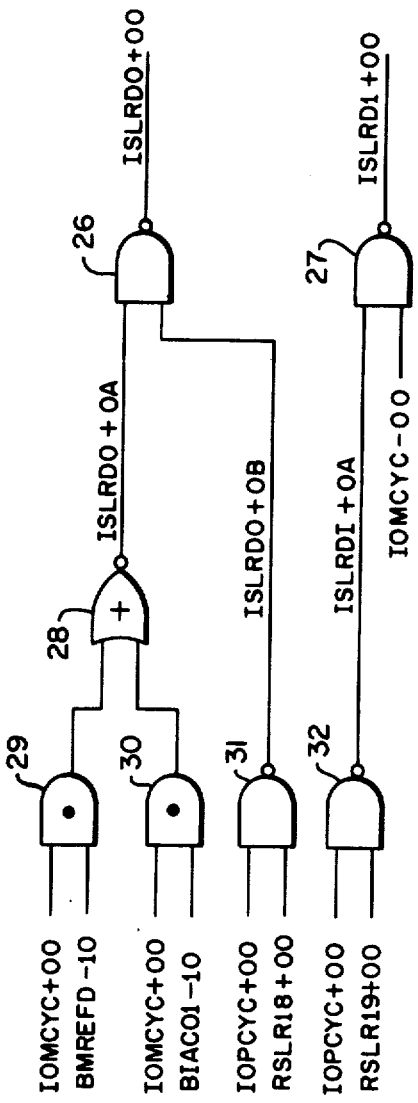
Figure 7:
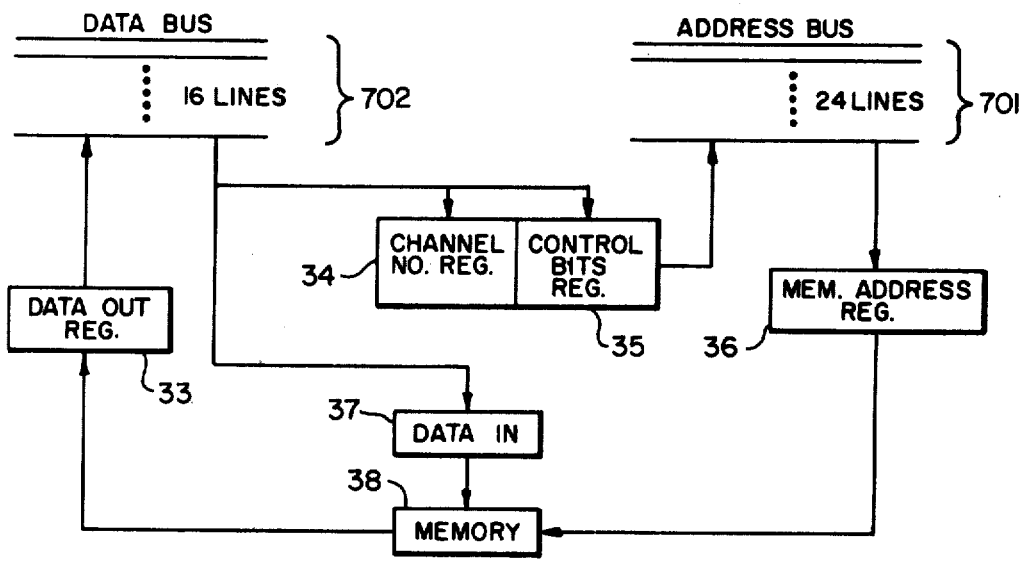
FIG. 7 is a block diagram illustrating the transfer of the device address information from the data bus to the address bus.

The IOM consists of four major units—the input/output bus interface, the system bus interface, a data pump, and an I/O processor. However, since these units are not necessary to the practice of the instant invention, only that portion of the IOM on FIGS. 6a and 6b are shown and described.

The HNP bus 200 permits any two units on that bus to communicate with each other. Any unit wishing to communicate, requests a bus cycle (see FIG. 5) described further infra. When that bus cycle is granted, that unit (the source) may address any other unit (the destination) on the bus. Information transfers during that specific bus cycle are in one direction only which is from source to destination. Some types of bus interchange require a response (read memory, for example). In that case, the requestor indicates that a response is required and identifies itself. When the required information is available, the original destination becomes the source for an additional bus cycle which supplies the information to the requesting unit. This completes the interchange which has taken two bus cycles in this case. Intervening time on the bus between these two cycles may be used for other additional systems traffic.

A source may address any other unit on the bus as a destination. The address of each unit is identified by a channel number with the exception of the memory type units which are identified by their memory address. A channel number is assigned for each such device. Full duplex devices as well as half duplex devices may utilize two channel numbers; some HNP full duplex channels, however, require only one number. Output only or input only devices use only one channel number each. Channel numbers are usually variable and accordingly one or more hexadecimal rotary switches (thumbwheel switch) may be utilized for each such unit connected with the bus to indicate or set to the unit address. Thus, when a system is configured, the channel number may be designated for the particular unit connected to the bus as may be appropriate for that particular system. Units with multiple input/output (I/O) ports generally require a block of consecutive channel numbers. By way of example, a four port unit may use rotary switches to assign the upper seven bits of a channel number and may use the lower order three bits thereof to define the port number to distinguish input ports from output ports. A source (sometimes called a master unit in this application) addresses a destination (sometimes called a slave unit in this application) by placing a destination address on the address leads of the address bus. There are 24 address leads which can have either of two interpretations depending on the state of an accompanying control lead, called memory reference (BSMREF—). When a master unit is addressing a slave unit and that slave unit is a memory, the format of FIG. 2a is utilized. This is indicated by having the memory reference signal BSMREF true. However, when the master unit is addressing a slave unit, which is not a memory, then the memory reference signal BSMREF is false and the format of FIG. 8c is utilized.

When a source or master unit requires a response from the destination or slave unit, such as in a read operation, it indicates this to the destination by a control bit signal named Response Required (BSRSVP+). In addition, the source provides its own identity to the destination by providing its channel number comprising generally ten bits on the data bus along with the address on the address bus; additional control information is also provided on the data bus on the lowest order six bits. When a response is required, therefore, by a source from a destination, the address is provided on the address bus and will take the format of FIG. 2a or FIG. 8c depending on the type of destination being addressed—memory being addressed by the format of 2a and other type units by the format of FIG. 8c. Moreover, when a response is required from the destination being addressed, the source additionally provides its own address, i.e. channel number on the first high order ten bits of the data bus and also provides control information on the six low order bits of the address bus. This latter operation is provided in two bus cycles.

Figure 1B:
Figure 4:
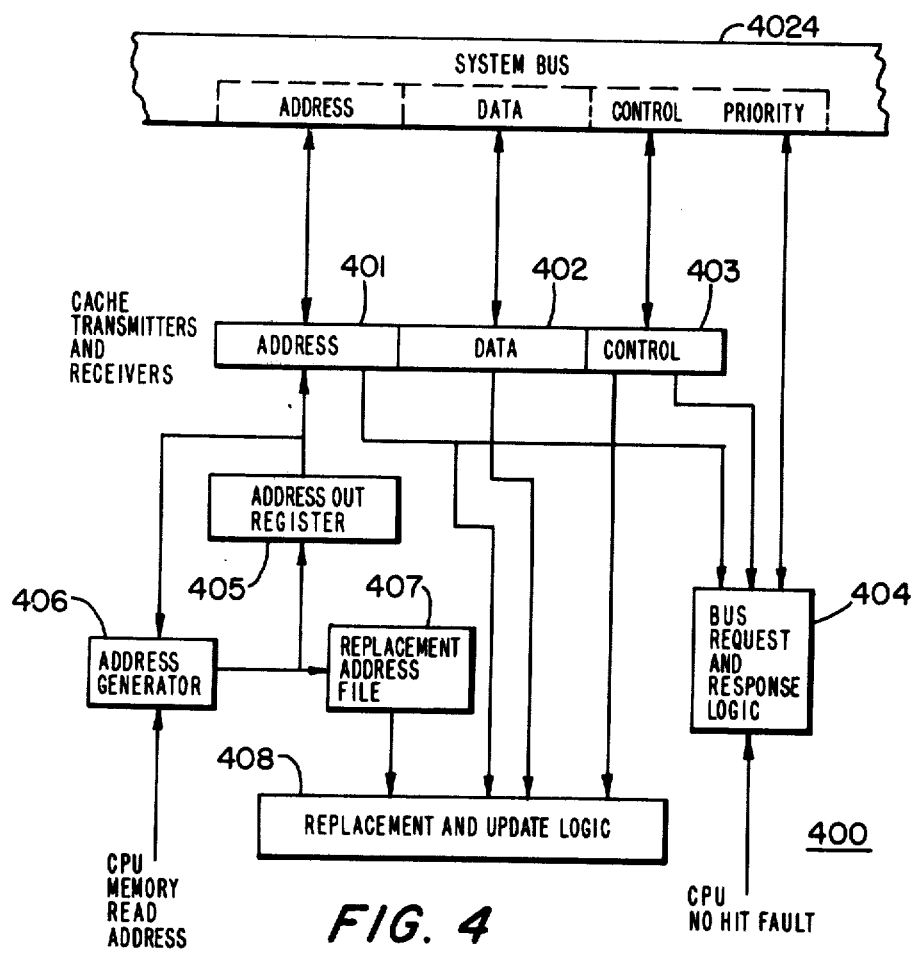
FIG. 4 is a general block diagram of the system bus interface unit.

Referring now to FIGS. 2a-2d, there is shown some typical address and data formats of the HNP bus system 200. The first five bits of the address format of FIG. 2a include the P, I, S, F and RFU bits. The only bit required to practice the invention is the F bit or format bit. This bit will be described in greater detail infra. Bits 5 through 23 are utilized to address a memory location. FIG. 2b illustrates the way the data is formatted on the data bus of the HNP bus system. It was previously shown that the data bus format of the NML bus system of FIG. 1 had the format of FIG. 1b; that is, there were two contiguous bytes, each byte consisting of 9 bits each plus 2 parity bits—a total of 20 bits. The format of FIG. 2b, on the other hand, also has 20 bits and includes an A bit on the high order side, a B bit between bits 7 and 8 and 2, 8-bit bytes comprised of bits 0-7 and bits 8-15. The format of FIG. 2c is utilized when data from the NML bus having the format of FIG. 1b is to be utilized as data in the HNP bus. Since the HNP bus has a data format as shown on FIG. 2b comprising a total of 20 bits, the data of the NML bus with a format of FIG. 1b must be realigned to a format as shown in FIG. 2d. This format has a zero in the highest bit position and also another zero between bits 7 and 8. Accordingly, bits 0-7 of FIG. 1b occupy bits 0-7 of FIG. 2c and bits 8-15 of FIG. 1b occupy bit position 8-15 of FIG. 2c. This transformation is easily accomplished as described in U.S. patent application Ser. No. 741,009 entitled "Automatic Data Steering and Data Formatting Mechanism", filed Nov. 11, 1976, and assigned to the instant assignee, and incorporated herein by reference. Referring to FIG. 4, of the Ser. No. 741,009 application there are shown connections for driver/receiver A and driver/receiver B. Driver/receiver A has connections for bits in accordance with the format of FIG. 2c while driver/receiver B has connections in accordance with the format of FIG. 1b. It will be seen that the A and B bits of driver/receiver A is coupled to an X terminal on driver/receiver B. The X indicates that that position is always zero. Hence, with this simple interconnection, formats of FIG. 1b may be transformed to formats of FIG. 2c and vice versa.

FIG. 2d illustrates still another word format utilized by the HNP bus 200 when storing certain types of information into the memory unit connected to that bus. In that format, the A and B bits occupy the two high order bit positions with two, eight bit types being stored contiguously in the remaining low order bit positions.

Figure 8A:
FIGS. 8a-8d illustrate the format of various information during a read cycle.
Figure 8B:
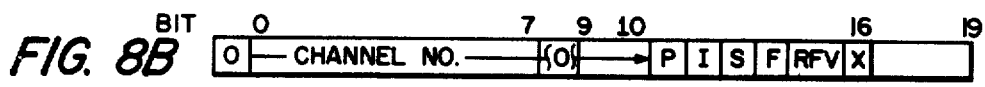
Figure 8C:
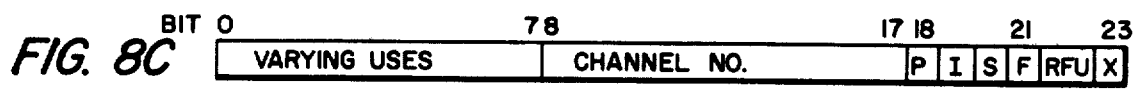
Figure 8D:
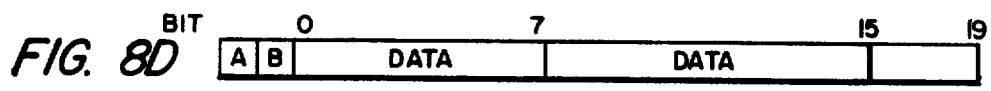

As previously noted, the formats of FIGS. 8a-8d are utilized when a source addresses a destination and expects a reply. As previously noted, FIGS. 8a and 8c illustrate the formats of the address bus when the source is addressing a memory type device and any other type device respectively. FIG. 8b is the format of the data bus when a source is addressing a destination and is expecting an answer, and hence is providing its own address (i.e. the channel number) on the data bus. Referring to FIG. 8a, bits 0 through 23 may be utilized for addressing a particular word in memory. An alternative format is shown on FIG. 2a where a smaller memory is being addressed and the high order bits are utilized as control information. Referring to FIG. 8c, the first 8 bits may be utilized for varying uses. Bits 8 through 17 are the channel number of the destination being addressed, whereas bits 18 through 23 are control bits. Referring to FIG. 8d, one data format of an HNP memory is shown and includes the A and B bits in the high order bit positions with 2, 8-bit bytes in the low order positions. FIG. 8d and FIG. 2d are similar; however, the format has also been included in this second grouping, because it will facilitate the explanation of a read cycle to be later more fully discussed.

Referring to FIGS. 6a and 6b, there are shown the circuits for generating the selector code for selecting the appropriate format. NAND gates 26, 27 and 16 generate the signals ISLRD0+00, ISLRD1+00, and ISLRD2+00 respectively, and these same signals form the selection code shown on the right hand edge of block 300 of FIG. 3 of the Ser. No. 741,009 reference supra. In order to select, for example, BIDI (1-8, 10-17) 305, the code 011 must be generated. This means that the signal ISLRD0+00 must be low or binary zero whereas the signal ISLRD1+00 and ISLRD2+00 must be high or binary one. Hence, referring to FIGS. 6a and 6b, NAND gate 26 must provide a low or a binary zero signal and NAND gates 27 and 16 respectively must provide high or binary one signals. In order for NAND gate 26 to be low, both input signals to NAND gate 26, ISLRD0+0A and ISLRD0+0B must be high. The ISLRD0+0A signal is the signal that controls placing of I/O bus data on the system data bus (when logic one); or placing channel number and format control bits of the data bus (when logic zero); and the ISLPD0+0B is the signal used only by the IOM Processor (not shown) when it is reading or writing the external I/O or System Bus. In order for the ISLRD0+0B signal to be high, at least one input signal to NAND gate 31 must be low, such as the IOP-CYC+00 signal or RSLR18+00 signal. The IOP-CYC+00 signal is low if the IOM processor (not shown) within the IOM is not accessing an external I/O bus or System Bus; it is high if the IOM processor is accessing an external I/O or System Bus. Similarly, the RSLR18+00 signal is utilized to indicate that the IOM processor (not shown) is accessing a bus when it is high.

In addition to input signal ISLRD0+0B being high, the input signal ISLRD0+0A to NAND gate 26 must also be high in order to have output signal ISLRD0+00 low. The ISLRD0+0A signal will be high when both input signals to NOR gate 28 are low. Both input signals through NOR gate 28 will be low when the output signals from AND gates 29 and 30 respectively are also low. The output signals from AND gates 29 and 30 will be low when at least one of the input signals to each of AND gates 29 and 30 is low. Accordingly, input signal IOMCYC+00 or input signal BMREFD−10 to AND gate 29 must be low or both must be low for a low output signal on AND gate 29. Similarly, input signal IOMCYC+00 and input signal BIAC01−10 to AND gate 30 or both must be low for a low output signal from AND gate 30. Signal IOMCYC+00 is low when a transfer from the I/O bus 201 to the system bus 202 is not taking place. Signal BMREFD−10 is low when a direct memory reference from the I/O bus 201 to any memory module 8 or 9 on the system bus 202 is not taking place. Similarly, the IOMCYC+00 signal on AND gate 30 may be low as previously described; and signal BIAC01−10 will be high when a response cycle is not required of the system bus. With these conditions met, a low output signal will be generated on NAND gate 26. This represents the high order bit of the selector code and for this example is a binary zero. The next highmost order bit of the selector code is provided at the output of NAND gate 27 as signal ISLRD1+00. For this same example, it is required that this signal be high. This signal will be high when either input signals ISLRDI+0A or I0MCYC−00 to NAND gate 27 or both are low. The ISLRD1+0A signal is low when IOM Processor (not shown) is reading I/O bus 201. The I0MCYC+00 signal is low when no transfer from the I/O bus 201 to the system bus 202 is taking place and conversely it is high when a transfer from the I/O bus to the system bus is taking place. One input signal to NAND gate 27 is low when the output signal of NAND gate 32 is also low, and this is low when either of the input signals or both to NAND gate 32 is high. The input signal I0PCYC+00 to NAND gate 32 is high if an IOM processor (not shown) within the IOM is accessing an external I/O or system bus; and conversely, it is low if the IOM processor (not shown) in the IOM is accessing an external I/O or system bus. The RSLR19+00 signal is high when the IOM processor (not shown) is accessing the I/O bus; and conversely, it is low when an IOM processor is accessing the system bus. Accordingly, it has been shown how the nextmost high order bit of the selector code is generated. Finally, to generate the lowest order bit of the selector code, NAND gate 16 must be high for this particular example where we are selecting element 305 having selector code 011. Output signal ISLRD2+00 on NAND gate 16 is high when either or both of its input signals are low. Accordingly, output signals from NOR gates 17 and 18 must either be both low or at least one low for this particular example. Output signal ISLRD2+0A from NOR gate 17 is low when either or both of its input signals are high. High input signals to NOR gate 17 are applied when high output signals result from AND gate 19 when both input signals are high. Similarly, a high output signal will result from AND gate 20 when both its input signals are high. The I0PCYC+00 signal is high when the IOM processor is accessing an external I/O or system bus register (not shown). The RSLR20+00 signal is high when IOM processor is reading the external I/O or system bus registers (not shown). Similarly, input signal BMWRTD+10 is high when there is a direct memory write operation from the I/O bus 201 to the memory on the system bus 202. This high signal is generated when the output of AND gate 23 is high and accordingly all input signals to AND gate 23 must also be high. Input signal I0MCYC+00 is high if a transfer from the I/O bus 201 to the system bus 202 is taking place. Input signal BMREFD+00 is high if a transfer of information is taking place from the I/O bus 201 to any memory 8, 9 on the system bus 202. The input signal BIAC01+00 is high when a response cycle is not required (e.g. writing memory by the I/O bus). With these conditions true, a high signal ISLRD2+00 will be generated and this will be the low order bit of the three bit selector code. A high output signal ISLRD2+00 from NAND gate 16 may be similarly selected utilizing the same reasoning by following the alternate path utilizing AND gates 25, 21 and 22 and NOR gate 18. Table I below identifies the various signals utilized by FIGS. 6a and 6b and also their function. Accordingly, any person of ordinary skill in the art may construct the apparatus to generate the selector code signals to select a predetermined format required.

TABLE I

| Signal Name | Source of Signal | Destination of Signal | Function of Signal |
| --- | --- | --- | --- |
| I0MCYC+00 | I/O Interface | Internal Bus | High if a transfer of information from I/O bus to system bus is taking place. |
| BMREFD+00 | " | " | High if information from an I/O bus to a memory module on the system bus is taking place. |
| BIAC01+00 | I/O Bus | System Bus | High when a response cycle is not required of the system bus. |
| I0PCYC+00 | IOM Processor | Internal Bus | High if an IOM processor is accessing an external I/O or system bus. |
| RSLR18+00 | " | " | A read operation on storage bit 18 only used when IOM processor is accessing a bus. |
| RSLR19+00 | " | " | Read operation on storage bit 19 only when IOM processor is accessing a bus. |
| RSLR20+00 | " | " | Read only storage bit 20 when IOM processor is accessing a bus. |
| BMWRTD+10 | I/O Bus Interface | Internal Bus | Direct memory write from I/O bus to system |

TABLE I-continued

| Signal Name | Source of Signal | Destination of Signal | Function of Signal |
|---|---|---|---|
| BIAI03+00 | I/O Bus | System Bus | bus. The format bit on the I/O bus which indicates reformatting must take place when it is: = 1 with write select 305 (FIG. 3). = 0 with write select 304 (FIG. 3). = X with read select 309 (FIG. 3). |
| MMAI21+00 | System Bus | I/O Bus | Format bit from memory on BSSHBC when: = 1 and SHBC code is 303. = 0 and SHBC code is 302. |
| SYSCYC+00 | System Bus Interface | Internal Bus | System Bus to I/O bus transfer. |
| ISLRD0+0A | I/O Bus Interface | " | |
| ISLRD0+0B | IOM Processor | " | |
| ISLRD1+0A | " | " | |
| ISLRD1+00 | Internal Bus | " | Signal for the high order bit of the selector code. |
| ISLRD2+00 | " | " | Signal for the low order bit of the selection code. |

It can be readily seen from the previous discussion that requests for data from another unit or for transfer of data, etc., are made via issuing predetermined signals. Combinations of these signals automatically generate a code which is utilized to automatically select the proper format for the particular operation being performed or requested. Normally, transfer operations involve information being transferred from the I/O data bus 201 to the system bus 202. Accordingly, a transfer from the I/O bus 201 to the system bus 202 will include in its path the IOM 11. Information may also be transferred from the system bus 202 which comes into the IOM together with the control signals, to the I/O bus 201 which accepts information from the IOM on the control signal. However, transfers of information between CPU and memories are performed over the system bus 100, 202.

Figure 5:
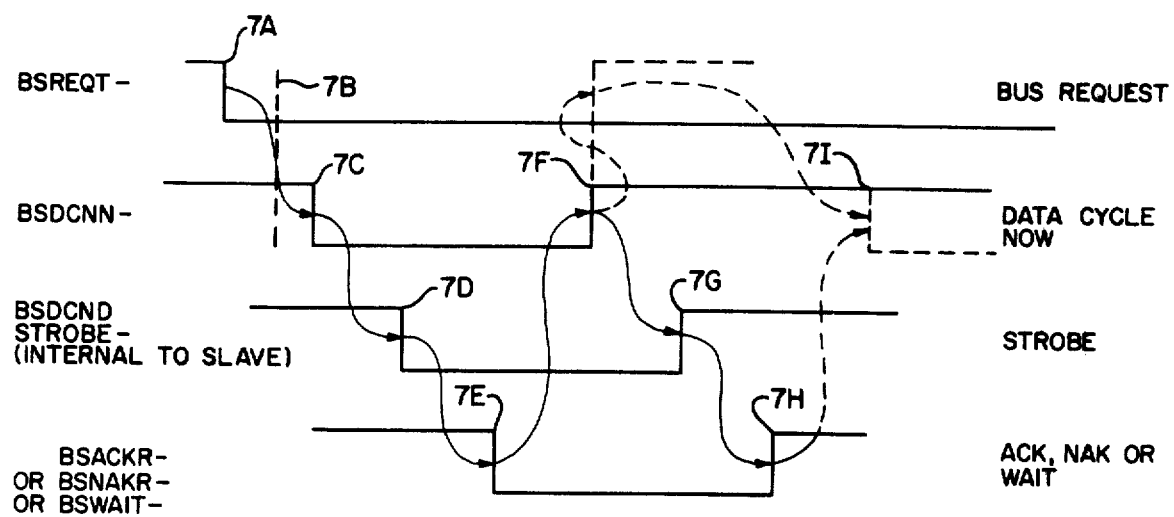
FIG. 5 is an illustration of a timing diagram of the operation of the bus of the present invention.

Referring now to FIG. 5, the timing diagrams of the HNP bus system will be discussed in detail. (For detailed timing of the cache memory see application Ser. No. 863,095, entitled "High Speed Buffer Memory System with Word Prefetch", filed on an even date with this application and assigned to the same assignee). In every bus cycle there are three identifiable parts; more particularly, the period (7-A to 7-C) during which the highest priority requesting device wins the bus, the period (7-C to 7-E) during which the master unit calls a slave unit, and the period (7-E to 7-G) during which the slave responds. When the bus is idle, the bus request signal (BSREQT-) is a binary one. The bus request signal's negative going edge at times 7-A starts a priority net cycle. There is an asynchronous delay allowed within the system for the priority net to settle (at times 7-B) and a master user of the bus to be selected. The next signal on the bus is the BSDCNN— or data cycle now. The BSDCNN— signal's transition to a binary zero at time 7-C means that use of the bus has been granted to a master unit. Thereafter, the second phase of bus operation means the master has been selected and is now free to transfer information on the data, address and control leads of the bus 200 to a slave unit that the master so designates.

The slave unit prepares to initiate the third phase of bus operation beginning at the negative going edge of the strobe of BSDCND— signal. The strobe signal is delayed, for example, 60 nanoseconds from the negative going edge of BSDCNN— signal via a delay line (not shown). Upon the occurrence of the negative going edge of the BSDCNN— signal at times 7-D, the slave unit can now test to see if this is his address and if he is being called to start the decision-making process of what response it is required to generate. Typically this will cause an acknowledge signal (BSACKR—) to be generated by the slave unit or in the non-typical cases a BSNAKR— or BSWAIT— signal or even no response at all (for the case of a non-existent slave) may be generated as herein described. The negative going edge of the acknowledge signal at time 7-E when received by the master unit, causes the master's BSDCNN— signal to go to a binary one at time 7-F. The strobe signal returns to the binary one state at time 7-G, which is a delay provided by a delay line (not shown) from time 7-F. Thus, in the third phase of bus operation, the data and address on the bus are stored by the slave unit and the bus cycle will begin to turn off. The ending of the cycle, i.e. when BSDCNN— goes to a binary one, dynamically enables another priority net resolution. A bus request signal may at this time, be generated and if not received, this means that the bus will return to the idle state, and accordingly the BSREQT— signal would go to the binary one state. If the bus request signal is present at that time, i.e. a binary zero as shown, it will start the asynchronous priority net selection process following which another negative going edge of the BSDCNN— signal will be enabled as shown by the dotted lines at time 7-I. It should be noted that this priority net resolution need not wait or be triggered by the positive going edge of the acknowledge signal at time 7-H, but may in fact be triggered at time 7-F just following the transition of the bus to an idle state if thereafter a unit desires a bus cycle, this process repeats in an asynchronous manner. The information which is transferred by this type of bus cycle may include 51 signals which break down as follows:

(a) 24 address bits;
(b) 16 data bits;
(c) 6 control bits;
(d) 5 integrity bits.

Having thus far described the structures and function of the bus system to which different types of system units may be connected, including main memories, and with which they communicate with each other, let us focus our attention on the interface between the system bus and the bus interface unit of the cache memory 301 and a CPU 303 as shown on FIG. 3. This will be done in conjunction with FIGS. 3 and 7 through 11.

Referring first to FIG. 3 there is shown a block diagram of CPU 312, and the cache memory unit 313 each coupled to the system bus 302 via bus interface units 301 and 302, to be described in detail infra. A private interface 311, also to be described in detail infra, connects the cache memory unit to the central processor unit, allowing main memory 8, 9 requests, addresses and data to be communicated between the central processor unit CPU 312 and the cache memory unit 313. The cache memory unit is disclosed in detail in U.S. application Ser. No. 863,092, entitled "A Word Oriented High Speed Buffer Memory System Connected to a System Bus" and filed on an even date with this application and assigned to the same assignee as the instant invention. The cache memory unit is comprised of four major logic units, the bus interface 301 (to be described infra), the private interface 311 (to be described infra) the replacement and update logic unit 314, and the cache directory and data buffer unit 315, both described in detail in the above-referenced U.S. application Ser. No. 863,092, entitled "Continuous Updating of Cache Store", and incorporated herein by reference.

The cache directory and data buffer unit 315, determines whether or not the requested main memory word is present in the cache random access memory (RAM) 313. The cache RAM 313 typically provides intermediate high-speed storage for 2,048 to 4,096 words that have been read from main memory, to supply data or instructions to the CPU.

The replacement and update logic unit 314 provides the hardware necessary to access main memory 1, 2 and be able to perform monitor functions. The monitor function checks and evaluates all main memory writer references (i.e. from the CPU 312, 4a, 12 or the IOM 11) and replaces data in any currently active cache memory location with the data from the system bus 202, 302.

The bus interface unit 301, connects the cache memory unit 313 to the system bus, enabling the cache memory unit 313 to access a main memory 1, 2 via the system bus 302 and to read out central processor unit required information not in the cache 313. Also the bus interface unit 303 connects the CPU 312 to the system bus 302 and provides logic for communication to other system units also connected to the system bus 302. The bus interface is comprised of the following: (a) system bus interface; (b) request and priority logic; (c) address generator logic; and, (d) replacement address filed logic, all described in detail infra and in co-filed U.S. patent application Ser. No. 863,092, entitled "Continuous Updating of Cache Store", referenced supra and in U.S. Pat. Nos. 4,030,075 and 3,993,981 both incorporated herein by reference.

The CPU 312 is comprised of subsystems well known in the art such as the arithmetic and logic unit ALU 316, and the control store unit 317. The portion of the CPU 312 which is pertinent to the instant invention is the bus interface unit 303, (or control unit) to be described in detail infra also with respect to FIGS. 7-11.

Referring now to FIG. 4 there is shown a typical system bus interface unit BIU400. Main memory requests, addresses, and data are sent and received via the CIU transmitters and receivers 401-404. (For details see FIGS. 7, 9-11 and description infra).

In brief, the central processor CPU 312 unit service cycle starts when the CPU simultaneously sends a memory read address (i.e. absolute main memory address) with the Read Request Signal to address generator 406 via the private cache/CPU interface 311 to the cache memory unit 313. (For details of private interface 311 see FIGS. 12, 13, and 15, and description infra). If the cache is not in an update or replacement cycle (i.e. the information in main memory is not being updated or the information in cache is not being replaced and replacement and update logic 408 is not activated) the CPU memory read address sent is switched into a cache directory (not shown) where a search and select operation is performed, generating an address Hit or No Hit indication. (For details of cache directory see above-referenced U.S. application Ser. No. 863,093, entitled "A Word Oriented High Speed Buffer Memory System Connected to A System Bus").

If the searched CPU memory read address is present (i.e. a Hit), the associated data in cache memory is sent to the CPU 312 over the private interface 311.

If the searched CPU memory read address sent was not present in the cache directory (i.e. a No Hit), the CPU memory read address is switched to the cache memory unit address out register 405 and a No Hit main memory fetch is initiated, and the system bus is activated to obtain the faulted word. Accordingly, the main memory requests, addresses, and data are sent and received by the bus interface unit BIU 400 via BIU transmitters-receivers 401-403 and bus request and response logic 404. (For further details see FIGS. 7, 9-11 and description infra). All copies of the absolute address sent to main memory are stored in the cache replacement file 407. (Details of replacement and update logic unit 408, are disclosed in co-filed U.S. application Ser. No. 863,092, entitled "Continuous Updating of Cache Store").

Referring now to FIGS. 7 and 8a-8d, a source unit on I/O Bus 201 requiring a memory readout provides a memory address on the Address Bus 701. This memory address has the format of FIGS. 8a or 2a, depending on the size of the memory. At the same time the requesting or source unit on the I/O bus 201 of FIG. 2 provides its address i.e. channel number and some control bits on the Data Bus 702. The information has the format shown on FIG. 8b. The memory address from Address Bus 701 is stored in Memory Address Register 36 while the channel number and control bits are stored in Channel Register 34 and Control Bits Register 35. The memory location in memory 38 addressed by Memory Address Register 36 is read out and the data stored on Data Out Register 33. The data is then placed on the data bus when the necessary timing (see FIG. 5) to complete the handshake operation of the data bus is complete, and a requesting unit now transformed into the receiving unit, acknowledges that it is ready to receive the data; the second bus cycle begins and the data from Data Out Register 33 is placed on data bus 702 and at the same time the channel number and control bits from registers 34 and 35 are placed on Address Bus 701 in accordance to the format of FIG. 8c. (It should be noted now that this is the address format when addressing a unit other than a memory unit). Accordingly, the address i.e. channel number, it placed on the Address Bus 701 on bit positions 9-17 whereas the control bits are placed on the Address Bus 701 on bit positions 18-23. However, as previously mentioned, the only bit of interest to this invention is bit 21 which is the formatting bit. This is recognized by the logic circuitry of FIG. 6a as signal MMAI21+100. When this bit is true, reformatting of the data is required and the type of reformatting will depend on the other signals representing other requests for operations that are present. It should be also noted that FIG. 6a is also responsive to formating bit number 3 of the format shown in FIG. 2a and is identified as signal BIAI03+00 on FIG. 6a. It should be further noted that the format of FIG. 8b corresponds to the format 308 in multiplexor 301 of IOM 300. Accordingly, when a read cycle is requested by a source unit from a memory unit, the data bus is automatically reformatted by the invention as previously discussed in detail with respect to other types of examples. Data-inlatch 37 is used for temporarily storing information during memory write operations.

Figure 9:
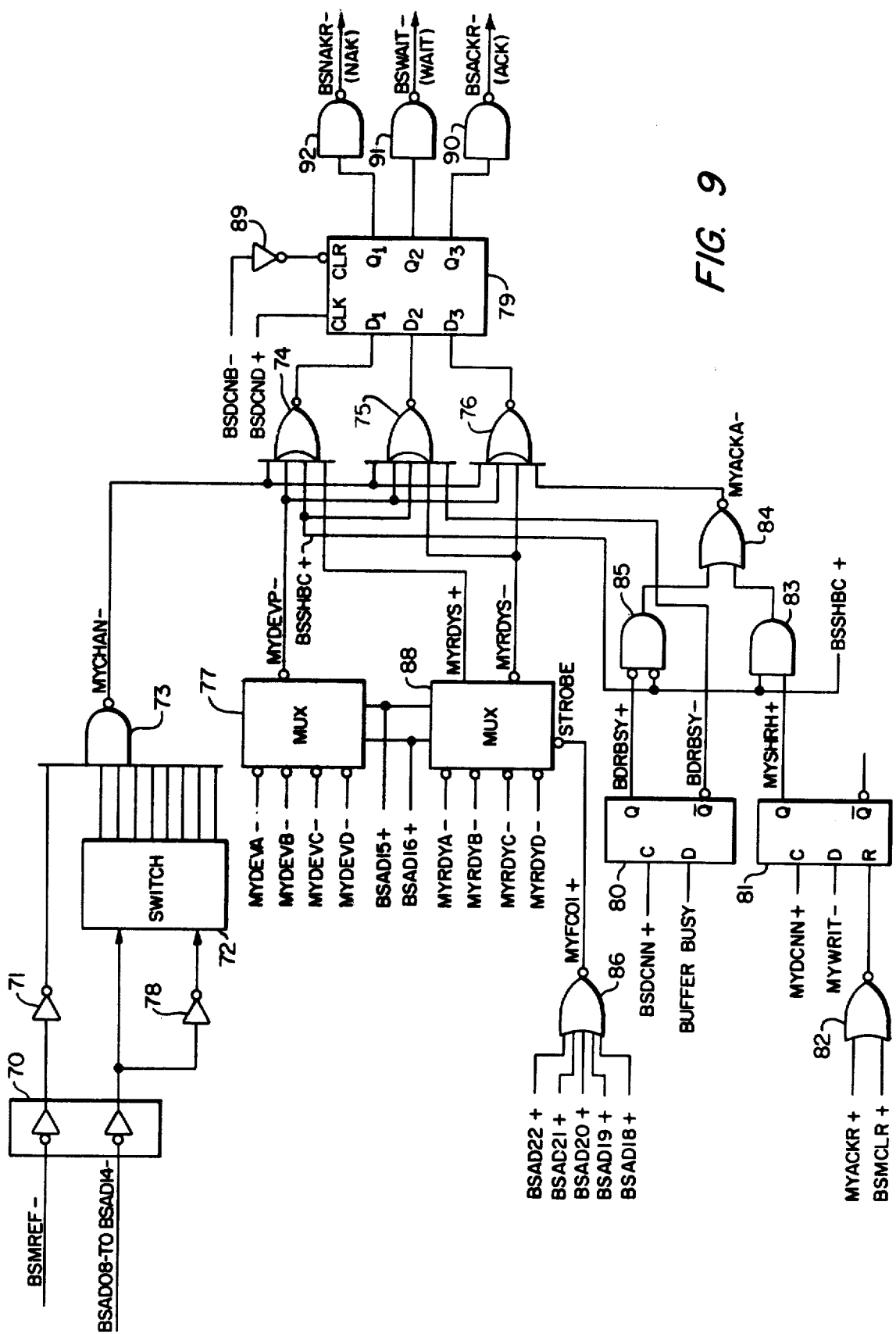
FIG. 9 is a detailed logic block diagram of the bus interface to a typical device controller coupled to the bus.

Referring now to FIG. 9 there is shown a typical controller address logic. This logic is exemplary of controllers, particularly those types having up to four subunits or peripheral devices connected thereto. Element 70 includes line receivers, one for the memory reference signal (BSMREF—), and the others, one each, for the bus address BSAD08— to BSAD14—. Because this logic in FIG. 9 is for a non-memory controller, a memory reference signal is a binary one, both at the input of element 70 and the output of inverter 71.

A switch 72 is coupled to receive the address leads as well as the inversion thereof via inverters 78. This switch is located in most device controllers connected to the bus 200 and is set to the address of the particular unit. The bus address leads at the input side of element 70, are a binary zero for those bits which reflect the proper address of the desired unit. Accordingly, with the inversion provided by element 70, binary one signals are provided at the non-inverted inputs of switch 72 for those bits of the address which were received on bus 200 as binary zeroes. Similarly, the output leads from the inverters 78 (there being as many inverters as there are leads) have binary ones for those positions in which the address bits are binary ones on the incoming address bits on bus 200. With the signals at the two inputs of switch 72 the complements of each other, the switches therein, which may be a hexadecimal switch or a plurality of toggle switches, more particularly a non-ganged seven pole, two position switch, are set so that for the correct device address, all binary one signals appear at the output terminals of switch 72. Thus, gate 73 will receive all binary one signals and will provide a binary zero at its output if this is the proper device address and if this is not a memory cycle as shall be explained. It can be seen that the switch 72 is arranged so as to provide a comparator function and eliminates the need for at least one level of gating and accordingly the associated propagation delay therefor. Further, the switch provides an easy means for changing the address of a particular unit thereby simplifying the manner in which a system may be configured.

The output of gate 73 is referred to as the MYCHAN— signal and will be a binary zero for the selected slave. The MYCHAN— signal is coupled to one input of each of the three NOR gates 74, 75 and 76 and, as shall be seen, is utilized to generate the ACK, WAIT, or NAK signal. The other inputs to gates 74, 75 and 76 are received as follows.

Multiplexor 77 is coupled to receive four signals (although a greater or lesser number may be utilized) from respectively up to four subunits or peripheral devices connected with the particular controller logic as shown in FIG. 9. These signals received at the inputs of multiplexor 77 indicate respectively whether or not the particular subunit is present, i.e. installed in the system. That is, one or more of such subunits may be connected. If only one is so connected, the only one of such signals will indicate the presence of a subunit. These signals indicating that the subunits are present are indicated as the MYDEVA—, MYDEVB—, MYDEVC—, and the MYDEVD— signals. Multiplexor 77 as well as multiplexor 88 to be hereinafter discussed may be that device manufactured by Texas Instruments having part number 74S151. The binary zero state of such signals indicates that the subunit is present in the system. The multiplexor 77 is enabled by the address signals BSAD15+ and BSAD16+ received from the bus 200 via inverting amplifiers or receivers not shown. The same two address signals are coupled to enable multiplexor 88. These two bits indicate which one of the, by way of illustration, up to four subunits or devices is being addressed. The output of multiplexor 77 is the MYDEVP— signal which, when a binary zero, indicates that the device addressed is present. Thus, each of the gates 74, 75 and 76 receives the output from multiplexor 77 and accordingly a response from a particular controller is governed by the presence of the controller's channel number and the fact that the controller actually has the subunit attached and present in the system. As shall be discussed hereinafter, this arrangement allows continuity in addresses between one subunit to the next in a manner to be more particularly discussed with reference to the memory address logic. In general, however, with more than one basic device controller 5-7 as shown in FIG. 2 in the system, and with each such controller 5-7 coupled to control different types of peripheral devices, or with all such controllers 5-7 coupled to control the same type of peripherals by selectively arranging such peripherals with the controller, the addresses for each such subunit or peripheral may be contiguous. Further, such addresses may be configured so that no matter how large or small the system, a particular address may have any type of peripheral device associated therewith.

The other multiplexor 88 is coupled to receive indications from any one of the four subunits, for example to indicate that in fact such subunit is ready to receive or send data. Thus, the ready signals received by multiplexor 88 are different from the presence signals received by multiplexor 77. Whereas the presence signals indicate whether or not the particular subunit or peripheral device is installed and present in the system, the ready signal indicates dynamically whether the associated subunit is ready and capable of sending data or receiving data. These ready signals are referred to as MYRDYA−, MYRDYB−, MYRDYC− and MYRDYD−.

The output of multiplexor 88 labelled MYRDYS−, when a logical zero, enables the generation of either a WAIT signal or the ACK signal depending upon the state of the other signals received at the gates 74, 75 and 76. If a binary zero is generated at the MYRDYS+ output of multiplexor 88, a NAK signal will be generated thus indicating that the addressed subunit is not in fact ready.

Gates 75 and 76 receive other signals, gate 75 receiving the BDRBSY− signal as shall be explained hereinafter and gate 76 receiving the MYACKA− signal from the output of gate 84. These two signals are explained with reference to the functions provided by flip-flops 80 and 81. In each controller, there is a buffer or register which accepts the data from the bus system 200. If this data buffer is busy, that is, it already has information stored therein which cannot be lost, then there will be an indication that the buffer is busy and this will be received at the D input of D-type flip-flop 80, whose D input will be reflected at the Q output thereof upon receipt of the clock signal which in this case is the BSDCNN+ signal received via a driver from the bus. Thus, at the time the data cycle now signal, i.e. the BSDCNN− signal, goes to the binary zero state as shown in FIG. 5, if the buffer associated with this particular controller is in fact busy, then the Q output of flip-flop 80, i.e. the BDRBSY+ signal will be a binary one which via NAND gate 85 will be a binary zero. This binary zero state coupled to the input of NOR gate 84 will generate a binary one at its output, which will then inhibit gate 76 from generating an ACK signal. However, the Q output of flip-flop 80, i.e. the BDRBSY− signal will be binary zero which will be provided at one input of gate 75, which if all the inputs are binary zeroes, will generate a WAIT signal. Thus, if the buffer is not busy and other conditions exist, an ACK signal will be generated. If the buffer is busy, then either a WAIT signal or a NAK signal, depending upon the other conditions, will be generated.

The flip-flop 81 is used to indicate whether or not this is a second half read cycle operation. As discussed hereinbefore, the BSSHBC− signal is used by the master to indicate to the slave that this is the information previously requested. From the time a pair of devices coupled with the bus has started a read operation (indicated by RSWRIT−) until the second cycle occurs to complete the transfer, (indicated by BSSHBC−), both devices may be busy to all other devices on the bus. Thus, looking at the inputs of flip-flop 81, the MYDCNN+ signal clocks the flip-flop, such signal coupled to and being the logical equivalent to the Q output of the grant flip-flop of the device which has become the master. Received at the D input of flip-flop 81, is the MYWRIT− signal which means that this was the particular device which started the memory read cycle and that such device is now waiting to read from the memory and that such particular device is expecting a second half read cycle to be later generated by the memory as the memory completes the cycle.

The second half read cycle history flip-flop 81 has as its reset inputs, the MYACKR+ and the BSMCLR+ signals, both coupled to the reset input via NOR gate 82. The BSMCLR+ signal acts to reset flip-flop 81 as discussed hereinbefore for various other flip-flops and the MYACKR+ signal indicates that the second half read cycle is complete. Thus, if the flip-flop 81 is set, this set condition is coupled from the O output of flip-flop 81 to partially enable one input of AND gate 83. In order to fully enable AND gate 83, the BSSHBC+ signal must be generated by the memory, indicating that this is the information previously requested. Thus, with the data coming from memory via the bus, this signal is activated and via NOR gate 84, the negative going edge of the MYACKA− signal is generated which permits the particular device to acknowledge this bus cycle by the enabling of gate 76 and via element 79, generating the ACK signal via driver 90. In addition and as indicated hereinbefore, an ACK acknowledgement may also be generated if in fact this is not a second half bus cycle and the buffer is not busy. This indication is provided by gate 85 through gate 84 in order to generate the ACK signal.

Thus, if the particular controller is waiting for a bus cycle, having had its second half read history flip-flop 81 set, then only the receipt of a second half bus cycle signal (BSSHBC+) can be responded to for this particular device. If this particular device is not busy, i.e. if there is no longer any useful information in such buffer, then an ACK signal may be generated.

In addition, the second half bus cycle signal (BSSHBC+) is received at one input of gate 74 as well as gate 75. When the second half read cycle flip-flop 81 has been set, the only output that can be obtained if this is the correct channel number, etc. as indicated by the inputs at gate 76, is an ACK signal. This is independent of whether or not the buffer is busy as indicated by flip-flop 80. Thus, a NACK signal or a WAIT signal will be generated by gates 74 and 75 only if this is not a second half bus cycle signal i.e. that the signal BSSHBC+ is a binary zero. In further explanation, a second half bus cycle received by the controller can come, only from the controller's point of view, from a memory and when the memory is ready to return the data to the controller, neither a NAK nor a WAIT signal can be generated, but rather only an acknowledge signal can be generated. Thus, if the BSSHBC+ signal is a binary one, then neither the NAK nor the WAIT signals can be generated.

As indicated hereinbefore, when information is being transferred from the memory, the memory can never receive a NAK or WAIT signal. This is because of the inherent priority arrangement of the apparatus of the present invention. The memory is the highest priority device. If a unit has asked memory to send it information, then the unit can expect the information at some point in time. If the unit generates a WAIT or NAK signal to the memory, then because the memory is the highest priority device, the memory could keep trying to gain access to the particular controller which requested the data transfer and could hang up the bus, i.e. it could because the memory is the highest priority device, cause the bus to effectively disable further data transfers until the data is accepted by the particular controller which had previously asked for it. Thus, only an acknowledge signal can be made in response to a request from memory to accept data. A controller, however, is allowed to generate a NAK or WAIT signal to another controller or a central processor. In addition, a general rule is that if one controller requests information from a controller of higher priority, the requesting controller must be read to accept the information, and accordingly must respond with an ACK signal.

With respect to the ready multiplexor 88, as indicated hereinbefore, if the device is not ready, then the NAK signal, other conditions being met, will be generated. The reason the NAK signal is generated rather than the WAIT signal is because of the fact that typically, if a controller is busy, the terminal will be busy more than just a few microseconds, but rather will be busy for milliseconds. Thus, cycle time would be wasted if the indication to the master is that the master keep trying. Rather, the indication should be that the requesting unit go on with data processing rather than unnecessarily using bus cycles thereby delaying the overall response of the system. All the requesting unit has to do is at its convenience retry the destination unit.

As indicated hereinbefore, the strobe input of multiplexor 88 receives a signal from gate 86 identified as the MYFC01+ signal. This signal is a combination of the multifunction code of the signals received at the output of NOR gate 86, such control bit or function code shown specifically in FIG. 8c, and identified as bits 18 through 22 with bit 23 not used. Within these bits, the function code is indicated so that the various units connected to the bus may recognize certain codes and commands, as hereinbefore discussed.

In summary, the NAK signal (BSNAKR−) is generated via driver 92 from the respective D-type flip-flop of element 79, by the full enabling of gate 74, and when BASDCN+ signal clocks such flip-flop. Gate 74 is fully enabled when the channel number is received, the device address provides an indication that it is in fact installed, that such device is not ready and that this is not a second half bus cycle. The WAIT signal (BSWAIT−) is provided on the bus via driver 91 from its D-type flip-flop included in element 79 when gate 75 is fully enabled. Gate 75 is fully enabled when the channel number is received, the device address provides an indication that it is in fact installed and that it is in fact ready, that there is an indication that this is not a second half bus cycle and that the buffer is busy. The acknowledge (BSACKR−) signal is provided on the bus by means of driver 90 in response to the D-type flip-flop included in element 79 when gate 76 is fully enabled. Gate 76 is fully enabled when the correct channel number is received, an indication that the device address as installed is provided, that such device addressed is in fact ready and that the buffer is not busy. However, should a second half read cycle signal be received, then an ACK acknowledge signal will be generated independent of whether or not the buffer is busy or not. Each of the flip-flops in element 79 is cleared in response to the BSDCNB− signal received from the output of the device then communicating via the bus, through inverter 89.

Figure 10:
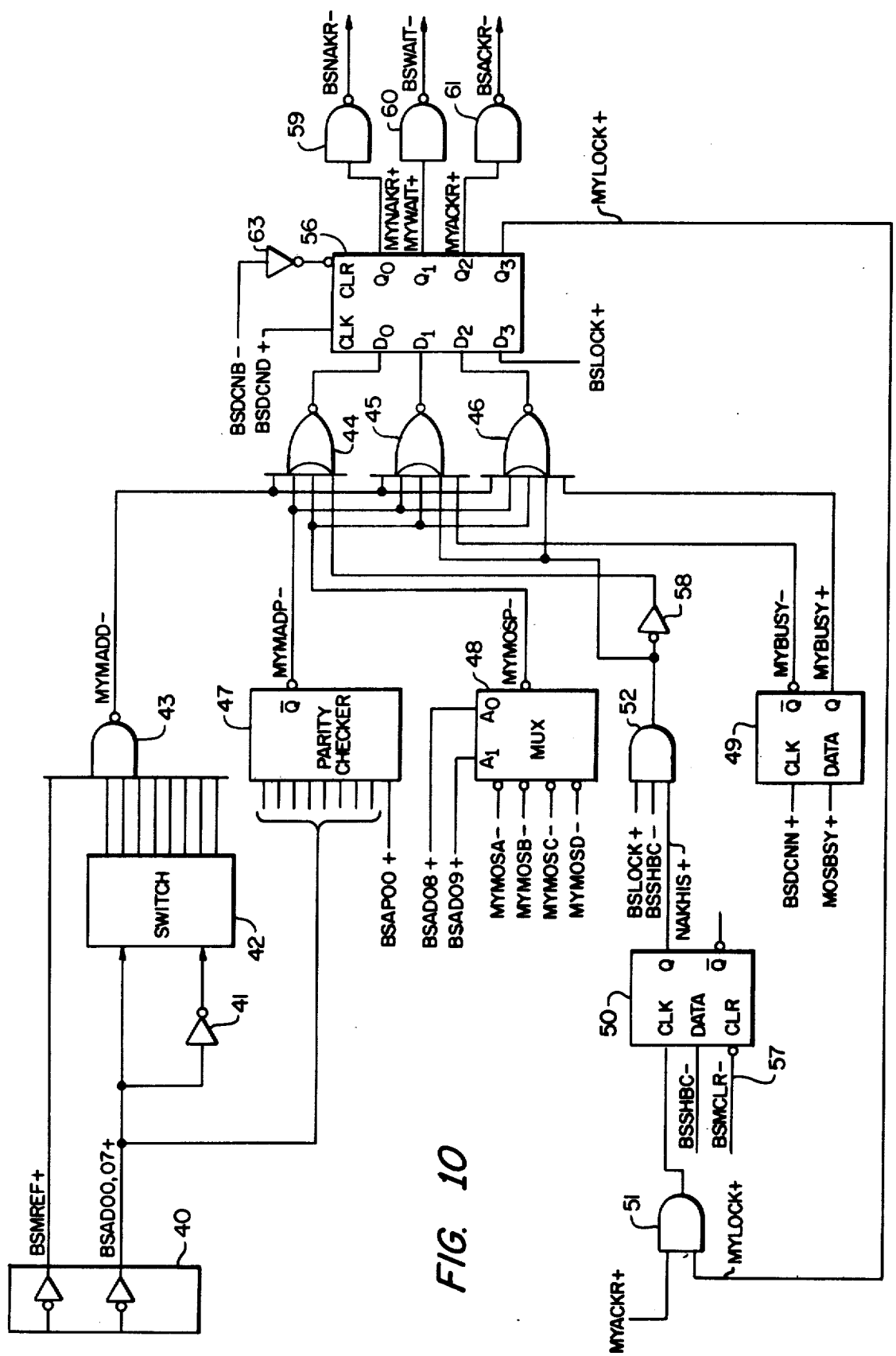
FIG. 10 is a detailed logic block diagram of the bus interface with a typical memory controller.

Having described a typical controller's address logic, such as controllers 5–7, typical address logic for a memory controller shall now be discussed. The memory controller logic of FIG. 10 is in many ways similar to the logic of FIG. 9. The address signal received by element 40 from the bus, is transferred as the bus address signals BSAD00+ through BSAD07+ in the format shown in FIG. 8a. The address signals from receiver 40 are also received at the inputs of parity checker 47. The address signals from receiver 40 and also those at the output of inverters 41 are received by a switch 42 in the same manner as indicated for FIG. 9.

If the memory reference signal (BSMREF+) is a binary one, and the address compared by switch 42 generates all binary ones at the output of switch 42, then NAND gate 43 will be fully enabled to provide a binary zero signal on the MYMADD− line which is received at one input of each of the three NOR gates 44, 45 and 46 which are utilized to generate the NAK, WAIT and ACK signals respectively. The memory cannot be addressed unless in fact the BSMREF+ signal is in the correct binary state.

As indicated, the addressed bits are received at the inputs of parity checker 47 which in addition receives the BSAP00+ bit which is the address parity received over the bus. Parity checker 47 makes a nine bit parity check and generates at its Q output, a signal labelled MYMADP−, which if a binary zero partially enables the gates 44, 45 and 46, thereby indicating that the parity is correct.

A third input to the gates 44, 45 and 46 is received from the multiplexor 48 which is analogous to multiplexor 77 of FIG. 9. Multiplexor 48 receives by way of example, four inputs labelled MYM0SA− through MYM0SD− which indicate whether or not any one or all of the memory modules connected to this particular controller are actually present in the system. This allows a memory to either have a full memory module array or allows it to have a partial array, that is, only one of such memory modules may be connected in the system. These four memory modules are further addressed, and via multiplexor 48 are tested to determine if they are installed by means of the two bus address signals BSAD08+ and BSAD09+.

Thus, for differently configured systems, there may be one memory module connected to one particular memory controller and there may be two such modules connected to another such controller and in fact the different memory modules connected to the different controllers may be of different types. For example, in this manner a semiconductor memory may be connected to one controller whereas a magnetic core memory may be connected to another. Further, different size, i.e. more or less storage capacity, memory modules may be used. Further, by arranging the memory modules in different controllers, then different speed memories may be used thereby increasing the speed of system response. Also, for any given controller there is normally only a given power support and timing capability and in the normal case, that controller establishes the personality of the memories that may connect to it. Accordingly, for example, if there are different types of memory speeds or different types of timing required such as for example between core and semiconductor memory, then a different controller must be utilized for each type. Further, by use of different controllers, the memories can be run faster since in fact they can be run essentially parallel in time with each other, even though they are connected to the same bus; however, only one transfer can take place at a time on a bus, the point being that the information will be read in the memory without any access time required since in fact the access time has already taken place.

As indicated hereinbefore, each controller whether it be for memory or another peripheral device, generally has its own specific address. Thus, for different memory controllers having a full complement of memory modules connected thereto, contiguous memory addresses may be provided. More specifically, assuming that each memory controller has four memory modules coupled thereto, and that each such module has the capability of about 8,000 words of storage, then each such memory controller will be able to provide access to 32,000 words of storage. With a full 32,000 words of storage coupled in the system for each memory controller, the addresses of the memories are contiguous. From an operations point of view, contiguous memory address is important not only for purposes of system addressing, but also for increased response in the system. As mentioned before, typically the memory controller can only provide service for a memory of a certain characteristic, i.e. a magnetic core memory cannot be coupled to the same memory controller as a semiconductor memory because of the basic timing differences associated therewith. The same is normally true for memories of different speeds or power requirements. Thus, assuming again that each memory controller may provide service for 32,000 words of memory, if only 16,000 words of memory are to be used for low speed memory and another 16,000 words are to be used for high speed memory, this means that two memory controllers must be used. However, this would typically mean that the memory addresses between the high speed and the low speed memory would not be contiguous because the memory controller addresses are 32,000 words apart. In this case, it is possible to provide contiguous memory addresses by allowing both of the memory controllers to have the same address. However, this would also mean that the respective memory module positions of the two controllers could not be both occupied in the same location in each such controller. More specifically, the first controller would utilize two 8,000 word storage locations in memory module positions A and B as indicated by the MYM0SA— and MYM0SB— signals. Thus, these two controllers appear in the system as if they were one controller. By way of further example, one such controller may have simply 8,000 words of one such memory coupled therewith in the form of one module, whereas the other memory module with the same address may have coupled therewith up to three such memory modules in the other three positions to accordingly provide 24,000 words of memory storage. This arrangement need not necessarily be limited to different types of memories, but in fact may address the problem of defective memory modules coupled with a controller. For example, a redundant memory module may be provided coupled with another controller whose device address may be set as may be appropriate upon detection of a failure in such memory module.

Referring again to the enabling of gates 44, 45 and 46, each of such gates in order to be enabled and allow a response from this particular memory controller, must receive its memory controller's address, an indication that the module addressed exists in the system, and that the address parity is correct, as indicated by parity checker 47. The other inputs to the NOR gates are serviced from a combination of busy logic and lock history logic as presently described.

The memory controller busy signal is provided by flip-flop 49 and indicates that any one of the memory modules connected to this controller is in fact busy. This D-type flip-flop 49 is clocked by the BSDCNN+ signal. If a memory module is busy, then a WAIT signal will be generated. Thus, if the MYBUSY— signal at the Q output of flip-flop 49 is a binary zero, this enables, if the other conditions are met, gate 45 to be fully enabled and to set the associated flip-flop in element 56, it being noted that this is done when the BSDCND+ signal is received at the clock input of element 56. At this point, it is noted that this flip-flop element 56 is cleared via inverter 63 when the BSDCNB— signal is received as was the operation for element 79 of FIG. 9. The acknowledge signal will be generated when a binary zero is generated at the Q output of flip-flop 49 as indicated by the MYBUSY+ signal coupled to one input of gate 46. It is again noted that the WAIT signal means that there will be a very short delay since the memory is still busy.

The other condition which indicates which of the ACK, NAK or WAIT signals is to be generated, is the lock signal which as indicated hereinbefore comprises a multi-cycle bus transfer whereby a device can access a specific memory location without any other locked unit being able to break into the operation. The effect of this locked operation is to extend the busy condition of the memory controller beyond the completion of a single cycle for certain kinds of operations. Devices attempting to initiate a lock operation before the last cycle of the sequence is complete will receive a NAK signal. The memory will, however, still respond to a memory request as shall be presently explained. It is noted that the intervening time between these cycles may be used by other units not involved in the transfer. A locked operation is used primarily where it is desirable for two or more units or devices to share the same resource, such as memory for example. The locked operation which can include any number of bus cycles is unlocked by the particular unit or device which has had control of the shared resource. While the shared resource is locked, other units desiring to access the shared resource will be locked out if such other units present the lock control signal. If the lock control signal is not presented, it is possible for such other unit to gain access to the shared resource such as for example to process an urgent request or procedure. Before any unit presenting the lock control signal gains access to the shared resource, it tests the resource to see whether it is involved in a locked operation and then during the same bus cycle, if the resource is not involved in a locked operation, it may gain access to the resource.

Thus, it can be seen that the locked operation for sharing a resource is one that is effective between those units which issue the appropriate controls i.e. the lock control signal, and may be used for example in sharing a portion of memory in which a table of information may be stored. Further, if one of the units desires to change information in the shared resource, other units may be locked out so that they do not gain access to only partially changed information, but rather are allowed access only after all such changes have been made. A read modify write operation may be involved in such case. By use of the locked operation, it can be seen that a multiprocessing system may be supported. For example, with two central processing units connected to the same bus system 200, both may share the memory units connected to the bus without interference if the locked operation is used.

It is noted that the BSSHBC— signal for the locked operation, as shall be seen, is used in a somewhat different manner than has been heretofore discussed. During the locked operation, the BSSHBC— signal is issued by the unit attempting to share a resource both to gain access to the shared resource by means of a test and lock procedure and to unlock the shared resource when it has completed its locked operation.

Thus, as can be seen by FIG. 10, a lock history flip-flop 50 is provided, which if set, indicates that a locked operation is in process, thereby enabling a NAK signal to be issued to a requesting unit via driver 59. Assuming that the logic of FIG. 10 represents the bus system 200 interface logic for the shared resource, the BSLOCK+ signal (binary one state) is received by both AND gate 52 and flip-flop D3 of element 56. Element 56 thereby generates the MYLOCK+ signal which is received at one input of AND gate 51. If the lock history flip-flop 50 is not set, the NAKHIS+ signal will be a binary zero thereby, independent of the state of the other two inputs to gate 52, generating a binary zero at one input of gate 46. If all inputs of gate 46 receive a binary zero, thereby indicating that the current address for this unit and device were received, and that the common element or buffer is not busy, then an ACK signal will be generated via element 56 and driver 61 in response to the BSLOCK+ signal. The ACK signal will fully enable AND gate 51 to set the history flip-flop 50 in response to the binary one state of the BSSHBC− signal at the D input thereof which is received with the binary one state of the BSLOCK+ signal at the commencement of the locked operation. Thus, a test and lock operation is performed during the same bus cycle.

If flip-flop 50 had already been set at the time of the receipt of the binary one state of the BSLOCK+ and BSSHBC− signals, then a binary one signal will be generated at the output of AND gate 52 thereby generating a binary zero state at the output of inverter 58 so as to enable NOR gate 44, all other conditions having been met, to generate the NAK signal. Thus, the test and lock operation would have produced a NAK response inhibiting another unit from using the shared resource.

Once the unit using the shared resource is through with its operation, it must unlock the resource, This is done by receipt from the user unit of the binary one state of the BSLOCK+ signal and the binary zero state of the BSSHBC− signal. This enables the logic of FIG. 10 to provide an ACK response, enabling gate 51 and thereby effectively resetting history flip-flop 50 because of the binary zero state of the BSSHBC− signal. The shared resource is now free to make an ACK response to other units.

It can be seen that the shared resource will only lock out other units which present the binary one state of the BSLOCK+ signal. If a unit, for example, desires to gain access to a shared resource which had its history flip-flop set so that the NAKHIS+ signal is a binary one, then, if the BSLOCK+ signal is a binary zero, the output of AND gate 52 will be a binary zero, thereby disabling a NAK response and enabling, dependent upon other conditions, either a WAIT or ACK response. Thus, a unit may gain access to a shared resource even though it is involved in a locked operation.

Thus, it can be seen that the generation of a WAIT signal from any one of the controllers, allows a device or controller of higher priority to break into the sequence of the bus cycles and use the bus as necessary. If there is not a higher priority unit which is requesting service, the particular master/slave arrangement will be maintained until the acknowledge is received by the master thereby ending the WAIT condition. Following this, another user is allowed to use the bus. Thus, the BSDCNN+ signal allows a slave to generate any one of three responses, either the NAK, WAIT or ACK signals. At the end of any one of these responses, a new priority net cycle occurs and this particular device gains access to the bus or another higher priority device wins the bus. It should be understood at this point that signal states on the bus are the inverse in binary state to those signals shown internal to the units. For example, the memory reference signal is referred to on the bus, between for example, drivers 59, 60 or 61 and receivers 40, to be in one state and in the opposite state in the controllers themselves. Further, as indicated hereinbefore, a fourth response between any of the controllers connected on the bus is that there is no response at all. Thus, if one of the masters is calling for service from the memory and this memory is not installed in the system, a time out element, well known in the art, will generate a signal after a certain period of time, such as for example, five microseconds, thereby generating a NAK signal. At that point, a central processor may take action such as by an interrupt or trap routine.

Referring again to the operation of the memory busy flip-flop 49, the data input is coupled to receive the MOSBSY+ signal which is asynchronous to the bus operation. This signal may be received at any time regardless of the operation which is occurring on the bus for any controller. When the BSDCNN+ signal is received from the master at the clock input of flip-flop 49, a history is stored as to the state of the memory, i.e. whether it is busy or not at that time. Thus, this eliminates confusion in the response to the bus cycle. Without the history retention provided by flip-flop 49, it would be possible to start out the bus cycle in a WAIT condition and end up with the same bus cycle in the state which generates an ACK condition. Thus, both responses would be made during the same bus cycle which would thus be an error condition. By use of history flip-flop 49, the response is fixed as to the condition which the controller was in at the time the BSDCNN+ signal is received, thereby allowing an asynchronous response and regardless of the tolerance or difference in memory speed.

Figure 11:
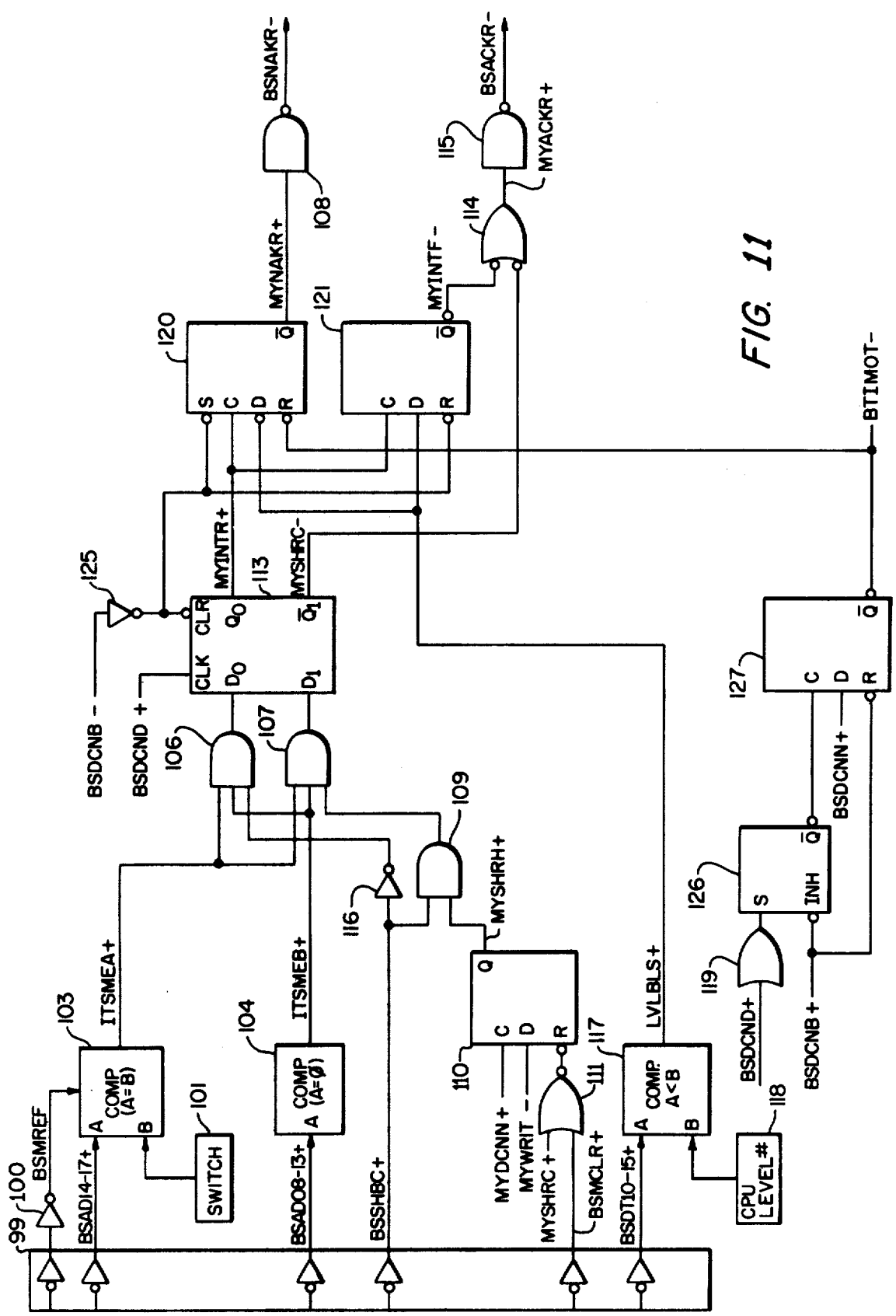
FIG. 11 is a detailed logic block diagram of a typical system bus interface.

Now referring to the typical central processor bus coupling logic of FIG. 11, the signals are received from the bus by means of the receivers included in element 99. The memory reference signal BSMREF+ is received by one of such receivers and inverted by means of inverter 100 and provided to one input of comparator 103 so as to enable such comparator if the address being received is not a memory address. One of the inputs for comparison by comparator 103 is the data processor address bits which in this case by way of example are four in number and are indicated as the BSAD14+ through BSAD17+ signals. This address received at one input of comparator 103 is compared with the address set by, for example, the hexadecimal switch 101 in the data processor itself. When the received address and the switch 101 provided address are compared and found to be equal, then comparator 103 generates ITSMEA+ signal which partially enables AND gates 106 and 107.

Further, address bits BSAD08+ through BSAD13+ are received at the inputs of comparator 104 which determines whether or not these bits are all zeroes. If they are all zeroes, then the ITSMEB+ signal is generated to also partially enable gates 106 and 107. Enabling of further input of either gates 106 or 107 will effectively set a respective flip-flop in element 113.

The other input to gate 106 is a second half bus cycle BSSHBC+ signal which is coupled to gate 106 via inverter 116. The second half bus cycle is also received at one input of AND gate 109. The other input to gate 109 is from the Q output of the second half read history flip-flop 110. The second half read history flip-flop is utilized to remember that the data processor issued its MYDCNN+ signal i.e. the setting of this device's grant flip-flop, and that the central processor also sent the signal entitled MYWRIT—, which implies that the data processor is expecting a response cycle from the slave. Thus, with such a two cycle operation, the second such cycle presents the expected data to the central processor, and the flip-flop 110 will identify this data as being that which the central processor requested by the fact that the history flip-flop 110 has generated the MYSHPH+ signal at the Q output thereof. Flip-flop 110 is reset via NOR gate 111 if the bus clear signal BSMCLR+ is received or if the second half bus cycle has been completed as indicated by the MYSHRC+ signal. The MYSHRC+ signal is derived from one of the outputs of element 113 to be hereinafter discussed.

Thus, AND gate 107 will be fully enabled if two of the inputs thereto indicate that this is the addressed device and that from the other input thereof, that there has been a second half bus cycle as indicated via AND gate 109 from history flip-flop 110. Thus, by the enabling of AND gate 107 the MYSHRC— signal will be generated and will be coupled to one input of NOR gate 114. NOR gate 114 will provide an ACK signal, (BSACKR—) via driver 115.

Gate 106 will be fully enabled when the proper unit address is received and if this is not a second half bus cycle, which thereby generates a positive pulse labelled as the MYINTR+ signal at the output of the respective flip-flop included in element 113. The MYINTR+ signal causes the logic of FIG. 11 to determine whether or not an ACK or a NACK signal will be generated. Which one of such signals is generated will depend on the interrupt level that is presently operating in the system as compared to the interrupt level of the device seeking processing time.

This decision regarding whether or not the interrupt level is sufficient is determined by means of comparator 117, which is a comparator for determining whether or not the A input is less than the B input. The A input of comparator 117 receives the BSDT10+ through BSDT15+ signals, which indicate; the interrupt level of the device coupled with the bus which is seeking data processing time. There are a plurality of interrupt levels provided in the system. Interrupt number level 0 receives the highest possible accessibility to data processing time and accordingly is non-interruptable. Thus, the lower the interrupt level number, the less change there is that such device's on-going processing will be interrupted. Thus, if the level number received at the A input of comparator 117 is less than the current level operating in the data processor as indicated by the level number in block 118, then the device seeking to interrupt as indicated by the signal received at input A will in fact be able to do so. If the A input is equal or greater than the B input, then the LVLBLS+ signal will not be generated and a NAK signal will be provided by the driver 108 and flip-flop 120 as shall be hereinafter described.

Thus, if the interrupt level received at input A, of comparator 117 is less than that received at input B, the LVLBLS+ signal will be a binary one and will be coupled to the D input of both flip-flops 120 and 121, it being noted that the D input of flip-flop 120 is an inversion. If the A signal is equal to or greater than the B signal as indicated by comparator 117, then a binary zero signal will be generated for the LVLBLS+ signal which will be received at the negation input of flip-flop 120. This will generate the NAK signal if the MYINTR+ signal is received at the clock input of flip-flop 120 by the setting of the respective flip-flop in element 113. If the level was sufficient i.e. if the A input was less than the B input as indicated by comparator 117, then a binary one will be generated at the LVLBLS+ signal and accordingly the MYINTR+ signal will clock this to the Q output of flip-flop 121 into one input of NOR gate 114 which via driver 115 will generate the ACK signal. Thus, if the MYNAKR+ signal is a binary one, then the NAK signal will be generated and if the MYINTF— signal is a binary zero, an ACK signal will be generated. The flip-flops in element 113 are clocked and cleared by inverter 125 in the same manner as previously discussed for similar flip-flop type elements. It should be noted that an ACK signal will be generated independent of the indication by comparator 117, if in fact this is the second part of the second half bus cycle. In such event, the MYSHRC— signal in one of the flip-flops of element 113 is coupled in the binary zero state to the other input of NOR gate 114 so as to generate the ACK signal thereby overriding any indication from flip-flop 121.

As indicated hereinbefore, the BSDCNB— signal via inverter 125 resets flip-flop 121 and in addition sets flip-flop 120, thereby initializing the flip-flops following the bus cycle. In addition, flip-flop 120 is reset by the logic associated with flip-flop 127 which generates a BTIM0T— signal indicating a time out condition, i.e. that a non-existent device was addressed and that in fact no response, neither a NAK, an ACK or a WAIT, has been generated by any potential slave device. Accordingly, there is provided a one-shot multivibrator 126 which may be set to have a five microsecond period for example. This multivibrator 126 is triggered by the receipt of the BSDCND+ signal i.e. the strobe signal, which is received at the input of buffer 119. Since the timing of the multivibrator 126 is in motion, if a BSDCNB+ signal is not received which signal indicates the end of the bus cycle, then after the period set by multivibrator 126, the BTIM0T— signal is generated at the Q output of flip-flop 127 via the clocking of the BSDCNN+ signal received at the D input of flip-flop 127, it being noted that the BSDCNN+ signal indicates that the bus cycle is still in process. The BTIM0T— signal operates on flip-flop 120 to generate a NAK signal. If on the other hand, the BSDCNB+ signal terminates before the end of the period set by multivibrator 126, the timing of multivibrator 126 is terminated and flip-flop 127 is prevented from generating the signal BTIM0T—.

It is noted that the data processor logic in FIG. 11 generates either a NAK or ACK signal, however, a WAIT signal is not so generated by the data processor logic. The reason for this is that the data processor always has the lowest priority and accordingly, if it generates a WAIT signal, the other devices generating their requests to the data processor for service will possibly experience a hang-up on the bus, if for example, a higher priority device was the master to which the central processor responded with a WAIT signal. Thus, just because the higher priority device is waiting for the lowest priority device, i.e. the central processor, other devices will be disabled from using the bus.

In further explanation of the present invention, it can be seen that the integrity of information transferred over the bus may be insured without the necessity of adding a parity bit for each byte of information transferred on the bus. This integrity may be provided for any units which transfer information therebetween. More particularly, this may be facilitated in those cases where a master unit in its request expects a response from a slave unit. Thus, the integrity of such data transfers may be best facilitated in those situations where two bus cycles are utilized in a bilateral bus transfer. This is particularly advantageous for example in a memory read operation wherein the master requests information from the memory and, during a later bus cycle, receives such information. It has been found, for example, that a substantial number of data transfers occur between the memory and another device during a read operation which requires two bus cycles and accordingly the data integrity feature of the invention is particularly important in such case.

Basically, the integrity apparatus takes advantage of the fact that when a master addresses another unit, which may be for example, a memory or a tape or disk peripheral unit, for information, the master places the address of the slave unit on the address leads on the bus and its own address and function code on the data leads of the bus. When the slave responds and in so responding is the master, the slave then places the requesting unit's address on the address leads and the data on the data leads. Thus, the requesting unit's address is received back on address leads as opposed to the transfer thereof initially on the data leads. The requesting device then compares its address i.e. its address transferred on the data leads with the address now received on the address leads, and if they compare, this insures that in fact at least its device address was received properly by the slave and that in addition, if the op-code is also received back, the op-code was received satisfactorily. Thus, for 16 bits of information as shown in the format of FIG. 8c, up to 2 parity bits are eliminated while maintaining the integrity of the data transfers in the system.

Figure 12:
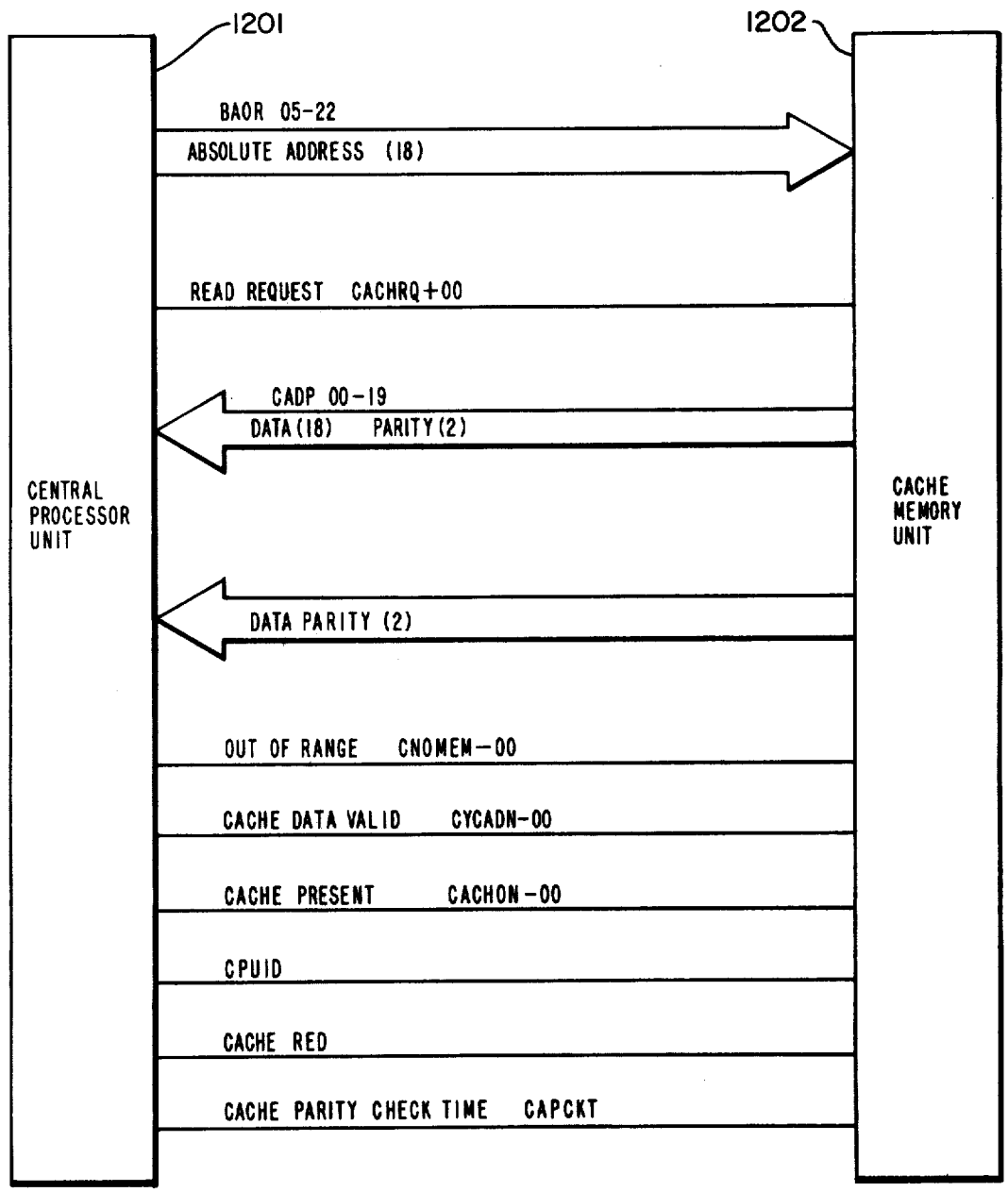
FIG. 12 is a diagramatic representation of the private cache memory CPU interface.

Referring to FIG. 12 there is shown a block diagram of the private interface between the CPU 1201 and the cache memory unit 1202. There are 43 signal lines that permit: (1) the CPU 1201 to send the address of the next word required for execution, and (2) the cache memory unit 1202 to return the contents of that word to the CPU accompanied by the conditions associated with that word or address. The private cache/CPU interface signals are defined as follows:

1. Absolute Address: (BA0R 05-22). These 18 signals transport the absolute address of the word that the CPU requires for program execution.

2. Read Request: (CACHRQ+00). This signal informs the cache memory unit that the absolute address signals have been encoded and that the cache memory unit is to proceed in reading that word.

3. Data: (CADP 00-19). These 18 signals transport the request word to the CPU for the CPU supplied absolute address.

4. Data Parity: These 2 signals carry odd parity for each byte of the requested word. The parity received from the system bus in response to a main memory read is treated as data in the cache memory unit (i.e. not regenerated or checked) and is passed on to the CPU.

5. Out of Range (CNOMEM-00). This signal indicates that the address requested does not exist in the current system configuration. The out of range signal is returned to the CPU when the cache memory unit does not find the requested word within the cache memory and receives a Negative Acknowledge (NAK) signal from the BIU in response to a main memory reference Memory Reference System Bus Cycle.

6. Cache Data Valid: (CYCADN-00). This signal indicates to the CPU that the information on the data and data parity signals may be ready for the CPU.

7. Cache Present: (CACHON-00). This signal indicates that the cache memory unit is installed in functioning (i.e. has passed its QLT).

8. CPU ID: This signal informs the cache memory unit of the CPU Identity that is attached to it.

9. Cache Red: This signal informs the CPU that the requested word from main memory has an uncorrectable read error.

10. Cache Parity Check Time: This signal informs the CPU that the result of the parity checker is available for strobing into the parity error flop (not shown).

The hardware logic block structures for generating these signals and for the CPU service cycle logic are disclosed in detail below in connection with FIGS. 13, 14 and 15.

Referring again to FIGS. 14 and 15 the CPU service cycle logic will be described. FIGS. 14 and 15 are drawn so that when a person of ordinary skill knows what the blocks represent he can ascertain the structure and function by the mnemonics of the various signals. For example, it has previously been shown in connection with FIG. 12 that the mnemonic for the read request signal is (CACHRQ). Attached to that mnemonic there can be either a plus sign or a minus sign followed by two integers. The plus sign following the mnemonic of a signal indicates that the signal in this instance the read request, is true when the signal is high; whereas a minus sign following the mnemonic of the signal again in this case the read request is true when the signal is low. The first of two integers following the plus or minus signal indicates when it is zero that it is the first occurrence of the signal in performing its function, and when it is one, it is the second occurrence and so on. For example, the signal may be first encountered on a flip-flop which in turn passes through an AND gate, which in turn passes through an inverter, a total of three occurrences of that signal. The second integer following the high order first integer is generally utilized for special conditions for example, to indicate that the signal is to apply to the reset of a flip-flop in which case it would be an R. Accordingly, with this as background let us now describe the CPU service cycle logic of FIG. 14 and the pertinent CPU service cycle of cache block timing diagram FIG. 15.

The CPU SERVICE CYCLE begins when the Cache Request (CACHRQ+00) signal is logically ANDed with the cache busy signals via gates 1401, 1402, and flip-flop 1403. Barring any cache activity a CPU Service Request (CPUREQ−10) is generated at the output of AND gate 1401 and sent to 100-nanosecond delay timing network 1417, 1405, 1407. This network is variable and provides an adjustable delay timing for the phasing of the cache and the CPU clocks. (Computer timing clocks are well known and are not shown here but a typical clock is shown and disclosed in U.S. patent application Ser. No. 710,540, filed Aug. 2, 1976 and entitled "Stretch and Stall Clock" by Thomas F. Joyce, et al). Referring at this point to FIG. 15 under the CPU service cycle the timing of various signals generated by the CPU service cycle logic of FIG. 14 is shown. When the CPU SERVICE REQUEST (CPUREQ) is true and the FIFO Not Empty (FEMPTY) signal remains true, the FEMPTY output signal (FEMPTY−20) goes low, generating the clock signal CLOCK0+0A high and the Cache Clock (CLOCK0+00) signal low. The Cache Clock (CLOCK0+00) going low drives the delay line, and thus a predetermined delay time later the delay signal CDLY40+00 goes low and the Cache Clock (CLOCK0+00) signal goes high. The Block Request flip-flop 1403, which is controlled by the Cache Clock (CLOCK0+10) signal, blocks or resets the CPU Service Request (CPUREQ) signal and the Cache Clock Control Logic returns to the Idle State. As a result of the Block Request flip-flop 1403 setting, further CPU Service Requests are inhibited. The Block CPU Request flip-flop 1403 remains set until the CPU Service Cycle terminates and the CPU Service Request (CACHRQ+00) signal in the CPU is reset. During the CPU Service Cycle, the cache performs the following internal operations which are more fully described in the co-filed patent applications referenced under Related Applications.

1. The cache reads the cache directory and data buffer 315 (i.e. a HIT and a NO HIT).

2. If a HIT occurs, the data/instructions are sent to the CPU 312 from cache memory unit 313.

3. If a NO HIT results, the Memory Request (MEMREQ+00) state is entered and the data requested of main memory 1, 2.

When the information requested by the CPU is not in the cache directory and data buffer, a Memory Request MEMREQ signal is generated and applied to flip-flop 1409. On the next Clock Cycle CLOCK0+10 the one output terminal of the MEMREQ+00 goes true and the cache memory enters the memory request state. If the information requested by the cache memory of the main memory is not found in main memory, the out of range signal CN0MEM−00 is generated and applied to NAND gate 1410 which in turn applies a Memory Request Reset Signal MEMREQ-1R to the reset terminal of flip-flop 1409 via NOR gate 1411, thus resetting the zero terminal of flip-flop 1409 and terminating the Memory Request Mode.

The CPU Service Cycle terminates when the CACHE/DONE signal (CYCADN+00) is set and applied to set flip-flop 1413 via delay network 1414, 1415 and inverter 1416 . The Cache Done Signal (CYCADN+00) is set by any of the following conditions:

1. The data requested is in the cache data buffer (i.e. a HIT) which is enabled onto the CPU data bus.

2. The data requested is retrieved from main memory and the cache FIFO buffer is enabled onto the CPU data bus (i.e. replacement cycle).

3. The data location address sent to the cache from the CPU is for a memory location outside the range of the configured memory (i.e. CN0MEM+00).

The CPU uses the leading edge of the Cache Done (CYCADN+00) signal to strobe the CPU data bus into its internal data-in register, start its clock and reset the CPU CACHE REQUEST (CACHRQ+00) flip-flop. The CACHE DONE signal (CYCADN+00) resets approximately 60 seconds after the CPU CACHE REQUEST (CACHRQ+00) signal is removed because of the delay network 1414, 1415, 1416.

Accordingly, the FIFO EMPTY SIGNAL (FEPTY−20) signal is true (i.e. low) at the output of clock start flip-flop 1406 and is inverted in inverter 1408 to a high signal which is then applied to Block Request Flip-Flop 1403 to inhibit the CPU cache request signal by providing the low block request signal (BLKREQ−00) to one input of NAND gate 1401. Thus, further CPU service requests are inhibited so long as this signal remains low as one input of NAND gate 1401. The Block CPU Request flip-flop 1403 remains set until the CPU service cycle terminates and the CPU service request signal (CACHRQ+00) in the CPU is reset. In addition, NAND 1401 may be controlled by gate 1402, which generates a low inhibiting output in response to a high signal at any of its four inputs. The latter are supplied by NOR 1404, D-flop 1412 and other control logic not pertinent to an understanding of the present invention and which is not here further described.

During the CPU service cycle, the cache performs the following internal operations:

1. The cache reads the cache directory and data buffer 315 (i.e. a hit, a no hit).

2. If a HIT occurs, the data/instructions are sent to the CPU.

3. If a NO HIT results, the memory requests state (MEMREQ+00) is entered.

The CPU service cycle terminates when the CACHE DONE signal (CYCADN+00) is set on flip-flop 1413 by any of the following conditions:

1. The data request is in the cache data buffer (i.e. a HIT), which is enabled onto the CPU data bus.

2. The data requested is retrieved from main memory and the cache FIFO buffer (not shown) is enabled onto the CPU data bus (i.e. replacement cycle).

3. The data location address sent to the cache from the CPU is for a memory location outside the range of the configured main memory (i.e. CN0MEM+00).

These different cycles and the hardware of the cache memory are described in greater detail in the above-mentioned co-filed patent application entitled "FIFO Activity Queue for a Cache Store".

The CPU uses the leading edge of the CACHE DONE signal (CYCADN+00) to strobe the CPU bus into its internal data-in register, start its clock, and reset the CPU CACH REQUEST flip-flop (CACHRQ+00), all described in the previous referenced patent application. The CACHE DONE signal (CYCADN+00) resets approximately 60 nanoseconds after the CPU CACHE REQUEST signal (CACHRQ+00) is removed.

Figure 14:
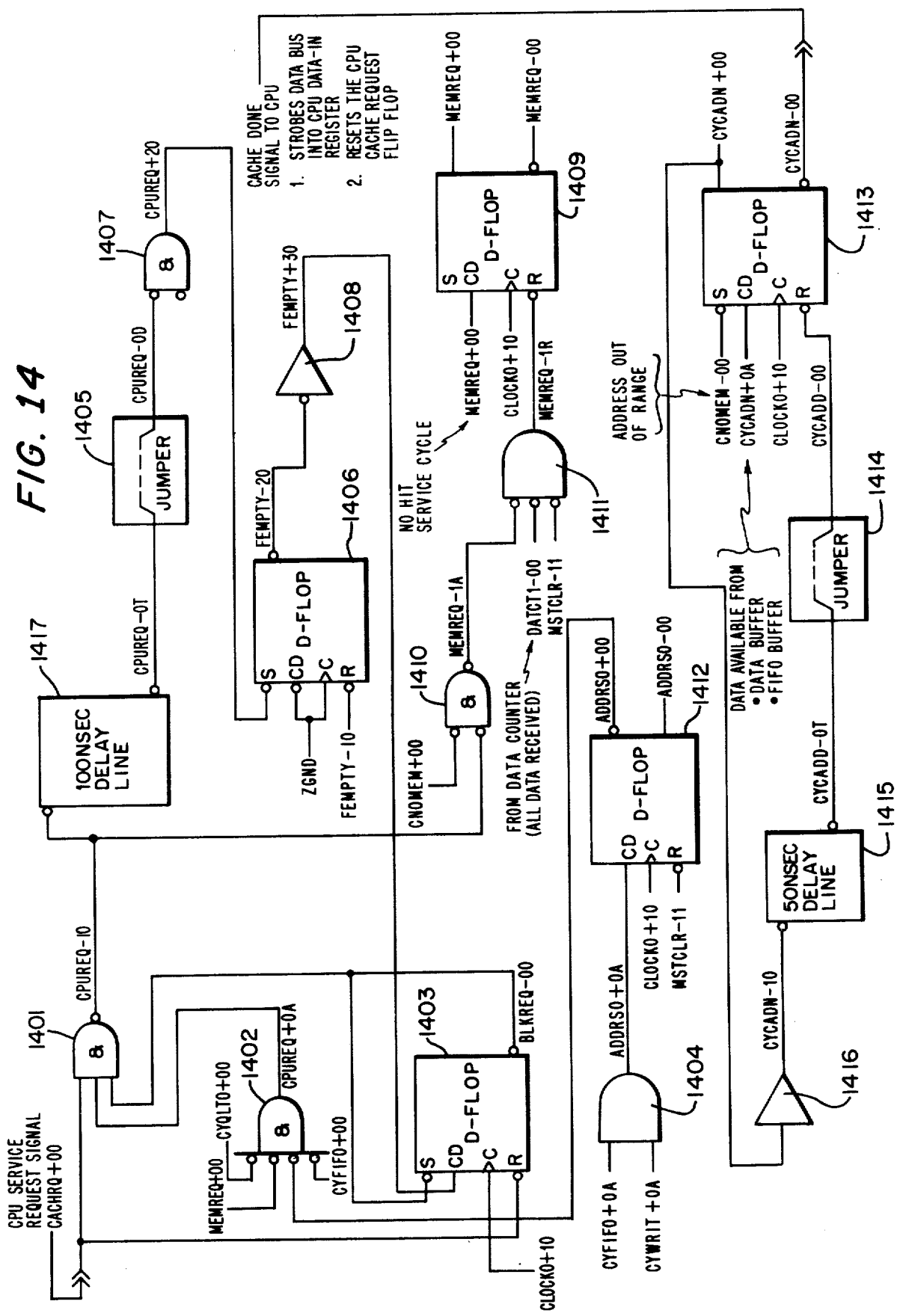
Figure 15:
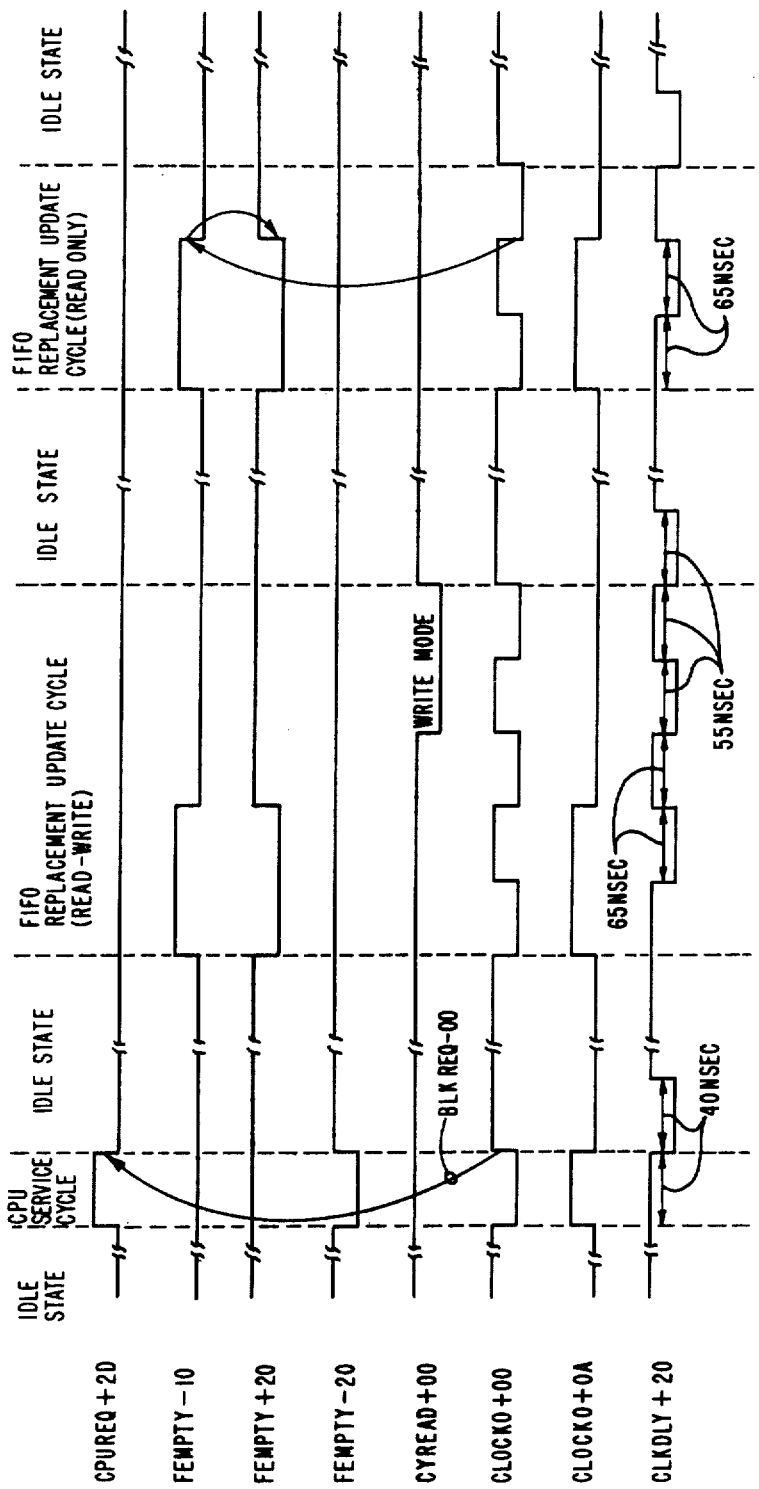
FIG. 15 is a cache/clock timing diagram.

The CPU service cycle is also shown on FIG. 15 in relation to the timing signals applied to the CPU SERVICE CYCLE logic hardware of FIG. 14. Referring now to the CPU SERVICE CYCLE of FIG. 15, it is shown that when the CPU SERVICE REQUEST signal (CPU REQ) is true and the FIFO NOT EMPTY signal (FEMPTY) remains true, the FEMPTY output signal (FEMPTY-T0) goes low, generating the CLOCK0=0A signal high and the CACHE CLOCK signal (CLOCK0+00) low. The CACHE CLOCK signal (CLOCKO+00) going low drives the delay line and accordingly typically 40 nanoseconds later drives signal CDLY40+00 low and the CACHE CLOCK signal (CLOCKO+00) high. The Block Request Flip-Flop, which is controlled by the CACHE CLOCK signal, (CLOCKO+10), blocks or resets the CPU SERVICE REQUEST signal (CPUREQ) and the cache control logic returns to the IDLE state.

Figure 13:
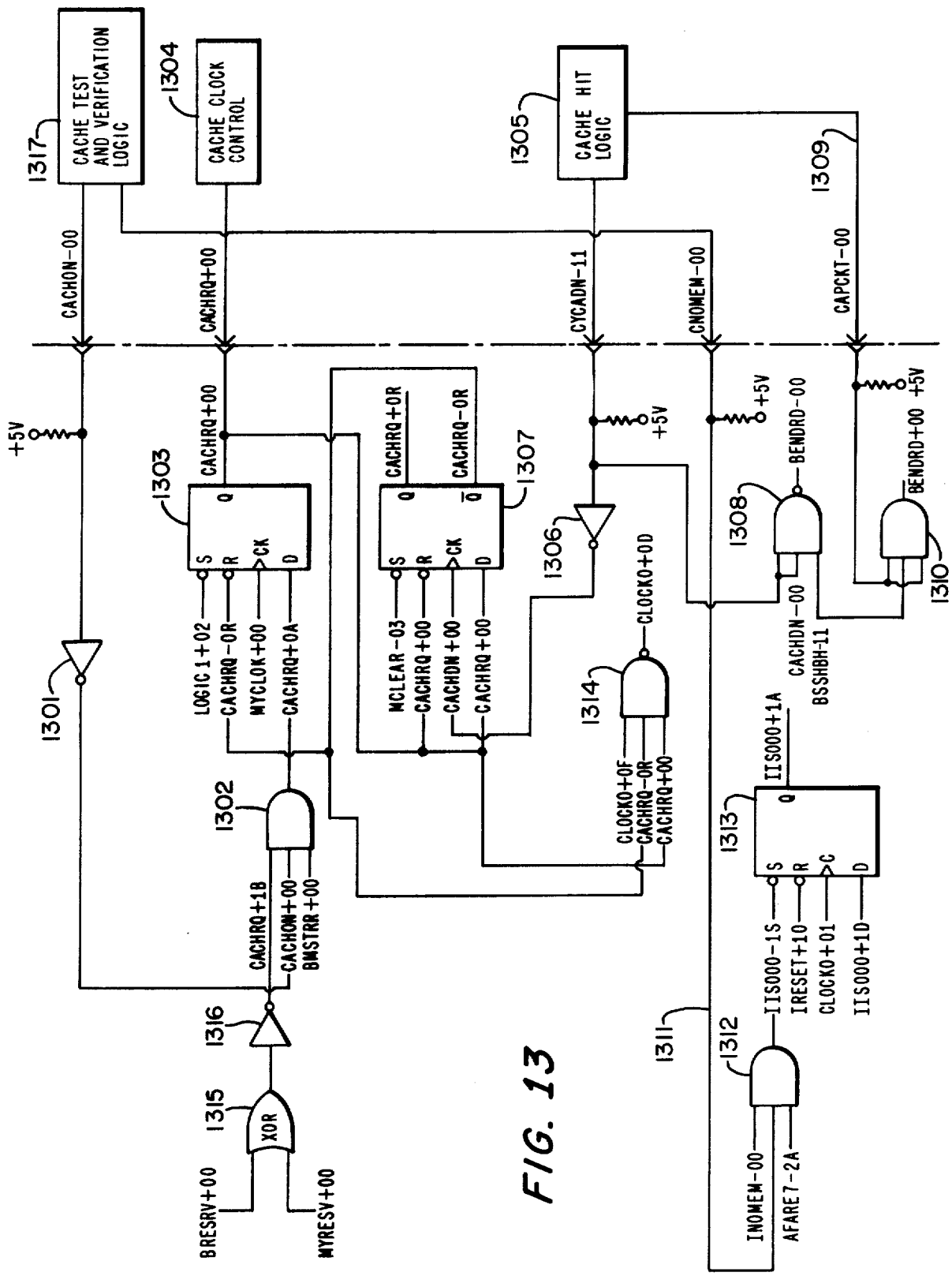
FIG. 13 is a detailed logic block diagram of the private cache memory CPU interface.

Referring to FIG. 13 there is shown the high speed logic for the private interface between the processor and the cache memory. The CPU utilizes this private interface to obtain information from cache or place information back into cache. If the information is not available in cache memory, then cache memory must go into main memory, obtain the information, place it into cache memory and also provide it to the CPU. When there is a memory lock-on or lock-off operation, then the CPU obtains information directly from main memory. Upon the occurrence of a "hit" in cache memory (i.e. the word addressed is located in cache memory) the data requested is provided to the CPU, and the cache request is reset. If the CPU provides an illegal address to the cache memory, then an illegal store opfault results.

Reviewing the logic block diagram of FIG. 13 in detail, a cache read request signal CACHRQ+0A is generated at the output of AND gate 1302 when all inputs to gate 1302 are high. The cache read request input signal CACHRQ+1B to AND gate 1302 is generated via exclusive OR gate 1315 and inverter 1316. It is high when both input signals BRESRV+00 and MYRESV+00 to exclusive OR gate 1315 are either high or low. It will be noted that when input signal BRESRV+00 from the CPU, which is a bus reservation signal, is high, and when input signal MYRESV+00 to exclusive OR gate 1315 is also high, the output from exclusive OR circuit 1315 will be low which then will be inverted in inverter 1316 and provide a high output CACHRQ+1B. Similarly, when the two input signals BRESRV+00 and MYRESV+00 are low, the output of exclusive OR gate 1315 is also again low which again is inverted in inverter 1316 providing a high output signal CACHRQ+1B. With both input signals to exclusive OR gate 1315 high, there is an indication that the cache request signal generated is in the maintain mode. On the other hand, with both input signals BRESRV+00 and MYRESV+00 are low, there is an indication that the CPU is in the not-set lock mode operation. If either one of the input signals to exclusive OR gate 1315 are high while the other one is low, there is an indication that CPU is in the set-lock now or reset-lock now mode.

Another input signal to AND gate 1302 that must be high in order to generate the cache request signal CACHRQ+0A is the cache-on signal CACHON+00. This signal is generated when the cache memory is attached to the CPU via the private interface and is turned on. The cache test and verification logic 1317, (see U.S. Application Ser. No. 863,096, entitled "Out of Store Indicator for a Cache Store", by T. Joyce, et al, and assigned to the same assignee as the instant application), senses that the cache memory is attached and provides a low input signal to inverter 1301 which in turn provides a high input signal CACHON+00 to an input terminal of AND gate 1302. Finally, for the cache read request signal CACHRQ+0A to be high the third input signal BMSTRR+00 on AND gate 1302 must also be high. This is a signal provided by the CPU which indicates that a main store read is to be performed when it is high. Accordingly, the following conditions must be true in order to generate the cache read request CACHRQ+0A signal which is applied to the D terminal of flip-flop 1303:

1. Main memory is not being locked or unlocked, and this is indicated by the CACHRQ+1B signal being high;

2. The cache is attached and is on which is indicated by the input signal CACHON+00 being high; and, 3. A main memory read is being performed which is indicated by the BMSTRR+00 signal being high.

As noted previously, the CACHRQ+0A signal is applied to the D input terminal of flip-flop 1303. With this signal high, flip-flop 1303 will set when the clock pulse signal MYCLOK+00 is applied to clock terminal CK. Accordingly, the Q terminal of flip-flop 1303 will go high and generate the CACHRQ+00 signal which is applied to the cache clock control 1304 (see application Ser. No. 863,095, entitled "High Speed Buffer Memory with Word Prefetch", by T. Holtey, et al, and assigned to the same assignee as the instant application), and is also applied to the D and R terminals of flip-flop 1307.

Flip-flop 1307 is the cache request reset flip-flop which is reset by flip-flop 1303 when the cache request signal CACHRQ−0R, which is applied to the inverted R terminal of flip-flop 1307, is low. Flip-flop 1307 will reset on the clock pulse CACHDN+00 applied to input terminal CK of flip-flop 1307 and is generated via inverter 1306 and cache hit logic 1305. (See application Ser. No. 863,095, entitled High Speed Buffer Memory With Word Prefetch and assigned to the same assignee as the instant invention). The rising edge of the CACHDN+00 pulse on the CK terminal of flip-flop 1307, clocks the CACHRQ+00 on the D input terminal of 1307, so that the CACHRQ+0R signal on the Q terminal of flip-flop 1307 is high and the cache request signal CACHRQ−0R on the Q terminal of flip-flop 1307 is low. This low signal is applied to the reset terminal of flip-flop 1303 and causes flip-flop 1303 to set on the rising pulse of the cache done CACHDN+00 signal. It is thus seen that although the cache done CACHDN+00 signal remains high for a duration, flip-flop 1303 can be reset immediately on the rising pulse and be utilized almost immediately again and thus actually recycle the next request with this type of logic within a typical time period of 40 nanoseconds. It should be noted that when cache request signal CACHRQ+00 was generated and was applied to the cache clock control 1304, it was also applied to an input terminal of NAND gate 1314 which caused the clock signal CLOCKO+0D signal to go low and thus stall the processor's clock. (See U.S. application Ser. No. 710,540, filed Aug. 2, 1976, entitled "Stretch and Stall Clock", and assigned to the same assignee as the instant application). The processor's clock remains stalled until data is delivered either from memory to the cache or from the cache directly back to the CPU. The CPU clock stalls on a low signal and starts on high.

Since the CACHRQ+00 signal on NAND gate 1314 is normally high when a request is being made to cache, and since the CACHRQ+0R signal is normally high until a CACHDN+00 signal on flip-flop 1307 clocks it low, the output signal of NAND gate 1314 goes low when the input clock timing pulse CLOCKO+0F on NAND gate 1314 goes high, thus stalling the CPU clock. The advantage of stalling the CPU clock rather than permitting it to run is that if information is available to be delivered from cache to the CPU in the middle of a CPU clock cycle, it cannot be delivered until the end of that cycle and accordingly time is wasted. By stalling the clock, it may be immediately restarted when information is available and there is no wasted cycle time. Accordingly, when information is available for the CPU, the CACHDN+00 signal is generated via CACHE HIT LOGIC (see U.S. Pat. Application Ser.

No. 893,095, entitled "High Speed Buffer Memory System with Word Prefetch" and assigned to the same assignee as the instant invention) which causes the CACHRQ−0R signal to go low at the Q terminal of flip-flop 1307, which in turn is applied to one input terminal of NAND gate 1314, causing its output to go high, thus restarting the CPU clock (not shown).

When there is a "hit in the cache memory" (i.e. the word addressed is in cache memory) in addition to stalling the processor clock it is necessary to check the data for parity and strobe it into the processor's data registers (not shown) when it becomes available. This is performed by applying the CYACADN−11 signal to one input of NAND gate 1308 which generates the bus end read signal BENDRD−00 and strobes data from the cache into a register (not shown) of the CPU. Approximately 80 nanoseconds later after the generation of the cache done signal CACHDN+00, AND gate 1310 is enabled by input signal CAPCKT−00 and BSSHBH−11 which provides a signal BENDRD+00 for checking parity.

Assuming that the CPU makes a request for a word from the cache which is not in the cache and the cache in turn requests the word from memory which again is not in memory, then a CYCADN−00 is set and CNO-MEM−00 signal 1311 is generated and applied to AND gate 1312. AND gate 1312 sets signal IIS000+1A of flip-flop 1313 which remains set until reset by signal IRESET+10. Signal IIS000+1A causes the CPU to abort the current instruction and process the no-memory fault signal and reset IIS000+1A signal via signal IRESET+10.

TABLE II

| | MEMORY INTERFACE SIGNALS | | |
|---|---|---|---|
| DIRECTION OF TRANSFER (BUS ⟷ MEMORY) | NUMBER OF LINES | DESIGNATION | MNEMONIC(S) |
| ⟷ | 16 | Address | BSAD23− through BSAD08− |
| → | 8 | Address | BSAD0− through BSAD00− |
| → | 1 | Address Parity | BSAP00− |
| ⟷ | 18 | Data | BSDT00− through BSDT15− BSDT0A−, BSDT0B− |
| ⟷ | 2 | Data Parity | BSDP00−, BSDP08− |
| → | 1 | Memory Reference | BSMREF− |
| → | 1 | Bus Write | BSWRIT− |
| → | 1 | Byte Mode | BSBYTE− |
| → | 1 | Lock | BSLOCK− |
| ⟷ | 1 | Second Half Bus Cycle | BSSHBC− |
| → | 1 | Master Clear | BSMCLR− |
| → | 1 | Power On | BSPWON+ |
| ⟷ | 1 | Bus Request | BSREQT− |
| ⟷ | 1 | Data Cycle Now | BSDCNN− |
| ⟷ | 1 | Acknowledge | BSACKR− |
| ⟷ | 1 | Wait | BSWAIT− |
| ⟷ | 1 | No Acknowledge | BSNAKR− |
| ← | 2 | Error Lines | BSYELO−, BSREDD− |
| → | 9 | Tie-breaking Network | BSAUOK+ through BSIUOK+ |
| ← | 1 | Tie-breaking Network | BSMYOK+ |
| → | 1 | Quality Logic Test In | BSQLTI− |
| ← | 1 | Quality Logic Test Out | BSQLTO− |
| → | 1 | Quality Logic Test Active | BSQLTA+ |
| → | 1 | Resume Interrupt | BSRINT− |
| → | 1 | External Control | BSEXTC+ |
| → | 1 | Timer | BSTIMR+ |
| ⟷ | 1 | Double-Word Pull | BSDBPL− |

TABLE III

| | | | NAME | |
|---|---|---|---|---|
| | | | CACHE SIDE | |
| CLASS | FUNCTION | BUS SIDE | DRIVER | RECEIVER |
| Timing | Bus Request | BSREQT− | MYREQT+ | BSREQT+ |
| ↓ | Data Cycle Now | BSDCNN− | MYDCNN+ | BSDCNN+ |
| ↓ | ACK | BSACKR− | MYACKR+ | BSACKR+ |
| ↓ | NAK | BSNAKR− | — | BSNAKR+ |
| Timing | WAIT | BSWAIT− | — | BSWAIT+ |
| Information | Data Bit 0 | BSDT0A− | ZGND | BSDT0A+ |
| ↓ | ↓ 1 | BSDT00− | LOGIC1+ | BSDT00+ |
| ↓ | ↓ 2 | BSDT01− | ZGND | BSDT01+ |
| ↓ | ↓ 3 | BSDT02− | ZGND | BSDT02+ |
| ↓ | ↓ 4 | BSDT03− | ZGND | BSDT03+ |
| ↓ | ↓ 5 | BSDT04− | ZGND | BSDT04+ |
| ↓ | ↓ 6 | BSDT05− | ZGND | BSDT05+ |

TABLE III-continued

SYSTEM BUS INTERFACE LINES

| CLASS | FUNCTION | BUS SIDE | NAME CACHE SIDE DRIVER | RECEIVER |
|---|---|---|---|---|
| ↓ | ↓ | 7 | BSDT06− ZGND | BSDT06+ |
| ↓ | ↓ | 8 | BSDT07− ZGND | BSDT07+ |
| ↓ | ↓ | 9 | BSDT0B− ZGND | BSDT0B+ |
| ↓ | ↓ | 10 | BSDT08 LOGIC1+ | BSDT08+ |
| ↓ | ↓ | 11 | BSDT09− CPUIDR+ | BSDT09+ |
| ↓ | ↓ | 12 | BSDT10− ZGND | BSDT10+ |
| ↓ | ↓ | 13 | BSDT11− ZGND | BSDT11+ |
| ↓ | ↓ | 14 | BSDT12− ZGND | BSDT12+ |
| ↓ | ↓ | 15 | BSDT13− ZGND | BSDT13+ |
| ↓ | ↓ | 16 | BSDT14− ZGND | BSDT14+ |
| ↓ | Data Bit | 17 | BSDT15− BLOCKF+ | BSDT15+ |
| ↓ | Address Bit | 0 | BSAD00− ZGND | — |
| ↓ | ↓ | 1 | BSAD01− ZGND | — |
| ↓ | ↓ | 2 | BSAD02− ZGND | — |
| ↓ | ↓ | 3 | BSAD03− ZGND | — |
| ↓ | ↓ | 4 | BSAD04− ZGND | — |
| ↓ | ↓ | 5 | BSAD05− BAOR05+ | BSAD05+ |
| ↓ | ↓ | 6 | BSAD06− BAOR06+ | BSAD06+ |
| ↓ | ↓ | 7 | BSAD07− BAOR07+ | BSAD07+ |
| ↓ | ↓ | 8 | BSAD08− BAOR08+ | BSAD08+ |
| ↓ | ↓ | 9 | BSAD09− BAOR09+ | BSAD09+ |
| ↓ | ↓ | 10 | BSAD10− BAOR10+ | BSAD10+ |
| ↓ | ↓ | 11 | BSAD11− BAOR11+ | BSAD11+ |
| ↓ | ↓ | 12 | BSAD12− BAOR12+ | BSAD12+ |
| ↓ | ↓ | 13 | BSAD13− BAOR13+ | BSAD13+ |
| ↓ | ↓ | 14 | BSAD14− BAOR14+ | BSAD14+ |
| ↓ | ↓ | 15 | BSAD15− BAOR15+ | BSAD15+ |
| ↓ | ↓ | 16 | BSAD16− BAOR16+ | BSAD16+ |
| ↓ | ↓ | 17 | BSAD17− BAOR17+ | BSAD17+ |
| ↓ | ↓ | 18 | BSAD18− BAOR18+ | BSAD18+ |
| ↓ | ↓ | 19 | BSAD19− BAOR19+ | BSAD19+ |
| ↓ | ↓ | 20 | BSAD20− BAOR20+ | BSAD20+ |
| ↓ | ↓ | 21 | BSAD21− BAOR21+ | BSAD21+ |
| ↓ | ↓ | 22 | BSAD22− BAOR22+ | BSAD22+ |
| Information | Address Bit | 23 | BSAD23− ZGND | BSAD23+ |
| Control Accompanying Transfer | Memory Reference | | BSMREF− LOGIC1+ | BSMREF+ |
| ↓ | Bus Byte | | BSBYTE− ZGND | BSBYTE+ |
| ↓ | Bus Write | | BSWRIT− ZGND | BSWRIT+ |
| ↓ | Second Half Bus Cycle | | BSSHBC− BXLOCK+ | BSSHBC+ |
| ↓ | Lock | | BSLOCK− ZGND | — |
| Control Accompanying Transfer | Double Pull | | BSDBPL− CYQLT0− | BSDBPL+ |
| Integrity Accompanying Transfer | Red | | BSREDD− ZGND | BSREDD+ |
| ↓ | Yellow | | BSYELO− ZGND | — |
| ↓ | Data Parity Left | | BSDP00− LOGIC1+ | BSDP00+ |
| ↓ | Data Parity Right | | BSDP08− BSDP08+ | BSDP08+ |
| Integrity Accompanying Transfer | Address Parity | | BSAP00− MYAP00+00 | — |
| Static Integrity | Logic Test Out | | BSQLTO− — | — |
| Static Integrity | Logic Test In | | BSQLTI− — | — |
| Miscellaneous Control | Master Clear | | BSMCLR− ZGND | BSMCLR+ |
| ↓ | Power On | | BSPWON+ — | — |
| Miscellaneous Control | Resume Interrupting | | BSRINT− — | — |
| Tie-Breaking Network | — | | BSAUOK+ — | — |
| ↓ | — | | BSBUOK+ — | — |
| ↓ | — | | BSCUOK+ — | — |
| ↓ | — | | BSDUOK+ — | — |
| ↓ | — | | BSEUOK+ — | — |
| ↓ | — | | BSFUOK+ — | — |
| ↓ | — | | BSGUOK+ — | — |
| ↓ | — | | BSHUOK+ — | — |
| ↓ | — | | BSIUOK+ — | — |
| Tie-Breaking Network | — | | BSMYOK+ — | — |

TABLE IV

RETURNED DATA NORMAL AND INTERMIXED DATA COUNTER INCREMENT TABLE (FOR TWO REQUESTS, DOUBLE-PULL MEMORY, AND INTERLEAVED MODE)

| RETURNED REQUESTED ASSOCIATE ADDRESS DATA SEQUENCE | REFER TO NOTE FOR EXPLANATION OF DATA ADDRESSES | | | |
|---|---|---|---|---|
| | PRA | PRA + 1 | PRA + 2 | PRA + 3 |
| Normal data return sequence (PRA, PRA + 2) (PRA + 1, PRA + 3) | | | +1 | +2 |
| Memory module priority reversal | | | +2 | +1 |

TABLE IV-continued
RETURNED DATA NORMAL AND INTERMIXED DATA COUNTER INCREMENT TABLE (FOR TWO REQUESTS, DOUBLE-PULL MEMORY, AND INTERLEAVED MODE)

| RETURNED REQUESTED ASSOCIATE ADDRESS DATA SEQUENCE | REFER TO NOTE FOR EXPLANATION OF DATA ADDRESSES | | | |
|---|---|---|---|---|
| | PRA | PRA + 1 | PRA + 2 | PRA + 3 |
| (PRA + 1, PRA) (PRA + 3, PRA + 2) Memory module priority reversal | | | | |
| (PRA, PRA + 1) (PRA + 2, PRA + 3) | | | +1 | +2 |
| PRA + 3 out of range (PRA, PRA + 2) (PRA + 1) | | +2 | +1 | |
| PRA + 3 out of range with memory module priority reversal (PRA, PRA + 1) (PRA + 2) | | +1 | +2 | |
| PRA + 2, PRA + 3 out of range (PRA, PRA + 1) | +1 | +2 | | |
| PRA + 2, PRA + 3 out of range with memory module priority, reversal (PRA + 1, PRA) | +2 | +1 | | |

NOTE

The data counter is incremented + 1 or + 2 (i.e., illustrated inside table squares) when signal BSDBPL is false along with the following associated data addresses: PRA, PRA + 1, PRA + 2, and PRA + 3.

We claim:

1. A data processing system comprising:
    a system bus;
    a plurality of system units including a main memory, a cache memory, a central processing unit (CPU), and a communications controller all connected in parallel to said system bus, said controller operating to supervise interconnection between said units via said bus to transfer data therebetween and said CPU including memory request means for generating data requests;
    said cache memory including:
        private interface means connecting said cache memory directly to said CPU for permitting direct transmission of data requests from said CPU to said cache memory and direct transmission of requested data from said cache memory to said CPU;
        cache directory and data buffer means for evaluating said data requests and generating a first predetermined output when the requested data is not present in said cache memory; and
        system bus interface means connecting said cache memory to said system bus for obtaining CPU requested data not found in said cache memory from said main memory via said system bus in response to said first predetermined output from said cache directory and data buffer means.

2. The data processing system of claim 1 wherein said cache memory also includes system bus monitoring means for producing a second predetermined output when said system bus is transmitting data to be written into a specific address in said main memory from said CPU.

3. The data processing system of claim 2 wherein said cache memory also includes replacement and update means responsive to said second predetermined output for replacing data in a specific address in said cache memory corresponding to said specific address in main memory with the data on said system bus.

* * * * *